(12) United States Patent
Fujinaga

(10) Patent No.: US 11,930,141 B2
(45) Date of Patent: Mar. 12, 2024

(54) INFORMATION PROCESSING APPARATUS, INFORMATION PROCESSING METHOD, AND COMPUTER-READABLE STORAGE MEDIUM WITH DISPLAY OF PREVIEW CORRESPONDING TO PAGE INCLUDED IN PRINTED PRODUCT HAVING BOOK FORM

(71) Applicant: CANON KABUSHIKI KAISHA, Tokyo (JP)

(72) Inventor: Seiya Fujinaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/158,579

(22) Filed: Jan. 24, 2023

(65) Prior Publication Data
US 2023/0247150 A1      Aug. 3, 2023

(30) Foreign Application Priority Data

Feb. 1, 2022   (JP) ................................. 2022-014435

(51) Int. Cl.
*H04N 1/00*   (2006.01)
(52) U.S. Cl.
CPC ..... *H04N 1/00458* (2013.01); *H04N 1/00448* (2013.01); *H04N 1/00466* (2013.01)
(58) Field of Classification Search
None
See application file for complete search history.

(56) References Cited

U.S. PATENT DOCUMENTS

| | | | | |
|---|---|---|---|---|
| 2011/0141506 A1* | 6/2011 | Sato | ...................... | G06F 3/1208 358/1.12 |
| 2011/0235109 A1* | 9/2011 | Yamaguchi | ........... | G06F 3/0485 358/1.15 |
| 2011/0317193 A1* | 12/2011 | Iwase | .................. | G03G 15/5087 358/1.13 |
| 2013/0208314 A1* | 8/2013 | Yamada | ............... | G06K 15/005 358/1.15 |
| 2014/0153014 A1* | 6/2014 | Kaneda | .............. | H04N 1/00411 358/1.15 |
| 2017/0038723 A1* | 2/2017 | Watanabe | .......... | G03G 15/6541 |
| 2019/0258438 A1* | 8/2019 | Izawa | ................ | G06K 15/1805 |
| 2020/0007698 A1* | 1/2020 | Ogawa | ............... | H04N 1/00188 |
| 2020/0012465 A1* | 1/2020 | Oiwa | .................... | G06F 3/1258 |

FOREIGN PATENT DOCUMENTS

JP   2011-205356 A   10/2011
JP   2017-033421 A   2/2017

* cited by examiner

*Primary Examiner* — Henok Shiferaw
(74) *Attorney, Agent, or Firm* — Venable LLP

(57) ABSTRACT

An information processing apparatus comprising an allocation unit for rearranging an order of original data of a plurality of pages and allocating the original data to book data used to generate a printed product having a book form, a display unit for displaying each of the original data and the book data along one direction on a predetermined display unit, and a setting unit for setting a binding method of the printed product having the book form, wherein the allocation unit changes, based on the setting of the binding method, an arrangement order of the book data to be displayed by the display unit.

21 Claims, 18 Drawing Sheets

PRINT SETTING

PRINTER: Inkjet_printerA — 1002

NUMBER OF COPIES: [1] COPIES — 1003

PRINT RANGE: ○ COVER AND TEXT
⦿ PAGE DESIGNATION (1-8) [SELECT...] — 1006
1004

NECESSARY NUMBER OF SHEETS: 4 SHEETS
(4 SHEETS/UNIT) — 1005

1001

BOOK SIZE: A4
NUMBER OF PAGES: 8
SHEET SIZE: A4
BINDING DIRECTION: RIGHT-SIDE BINDING
BINDING METHOD: SIDE STITCH (1 in 1 PRINT)
COVER SHEET TYPE: NORMAL PAPER
TEXT SHEET TYPE: NORMAL PAPER

[OPERATION EXPLANATION ☐]

[OK]  [CANCEL]

1009

1000

INFORMATION PROCESSING APPARATUS, INFORMATION PROCESSING METHOD, AND COMPUTER-READABLE STORAGE MEDIUM WITH DISPLAY OF PREVIEW CORRESPONDING TO PAGE INCLUDED IN PRINTED PRODUCT HAVING BOOK FORM

BACKGROUND OF THE INVENTION

Field of the Invention

The present invention mainly relates to an information processing apparatus.

Description of the Related Art

Some information processing apparatuses for performing image processing and the like can perform editing for a book such as a photobook (see Japanese Patent Laid-Open Nos. 2017-33421 and 2011-205356).

When a printer performs printing for a book, information processing considering, for example, a binding position may be demanded from the viewpoint of improving convenience.

SUMMARY OF THE INVENTION

The present invention improves convenience when performing printing for a book.

One of the aspects of the present invention provides an information processing apparatus comprising an allocation unit for rearranging an order of original data of a plurality of pages and allocating the original data to book data used to generate a printed product having a book form, a display unit for displaying each of the original data and the book data along one direction on a predetermined display unit, and a setting unit for setting a binding method of the printed product having the book form, wherein the allocation unit changes, based on the setting of the binding method, an arrangement order of the book data to be displayed by the display unit.

Further features of the present invention will become apparent from the following description of exemplary embodiments (with reference to the attached drawings).

BRIEF DESCRIPTION OF THE DRAWINGS

FIG. 3 is a schematic view showing an example of the basic setting screen of a bookbinding application;

FIG. 10 is a schematic view showing an example of the print setting screen of the bookbinding application;

DESCRIPTION OF THE EMBODIMENTS

Figure 1:
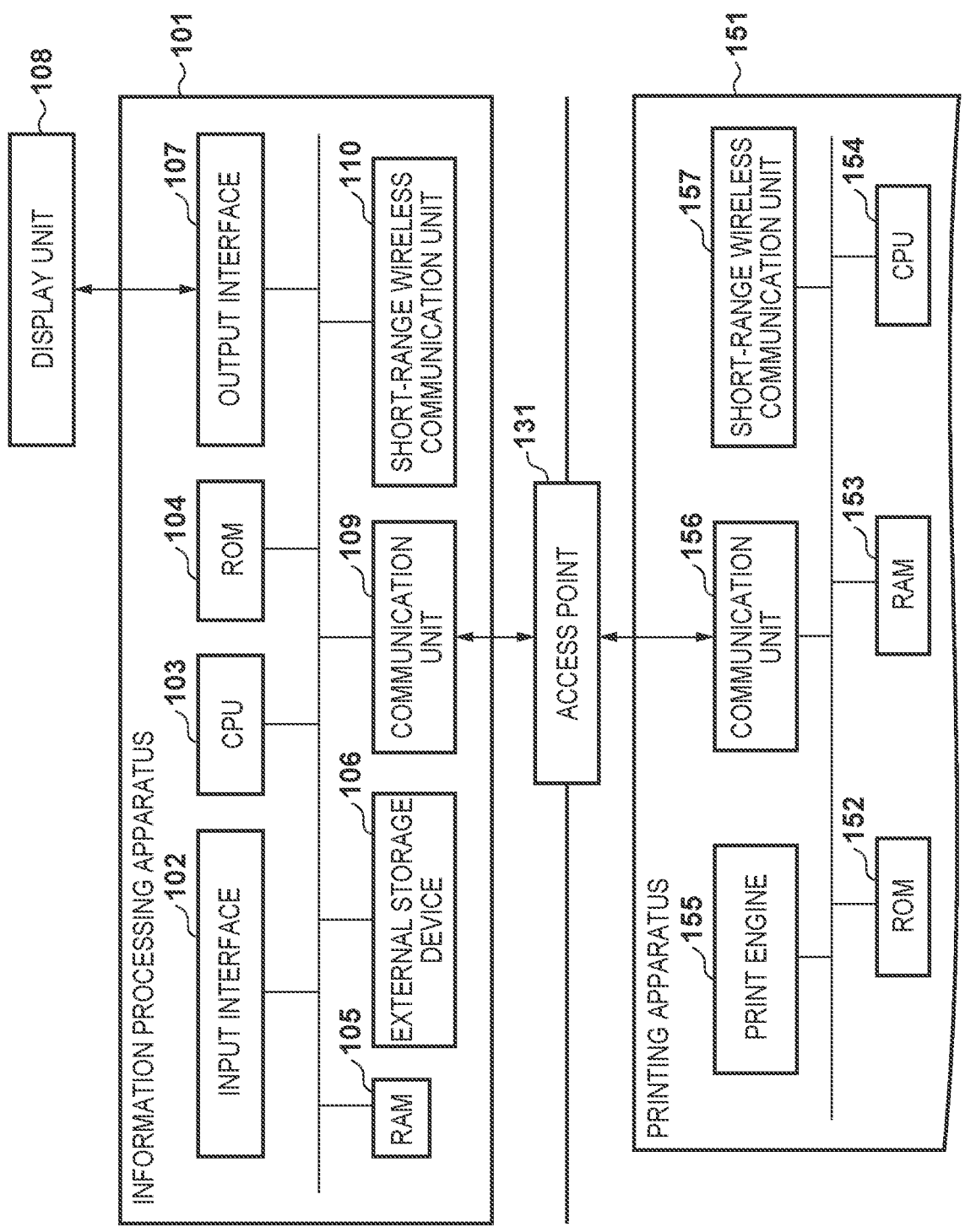
FIG. 1 is a block diagram showing an example of the configuration of a system according to the embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(System Configuration)

FIG. 1 is a block diagram showing an example of the configuration of a system SY according to the embodiment. The system SY includes an information processing apparatus 101 and a printing apparatus 151. Each of the information processing apparatus 101 and the printing apparatus 151 is configured to be communicable with an arbitrary external apparatus connected to it, and the information processing apparatus 101 and the printing apparatus 151 can also communicate with each other. In this embodiment, the information processing apparatus 101 and the printing apparatus 151 can communicate with each other via an access point 131 using a wireless LAN complying with the IEEE802.11 standard. As will be described later in detail, the system SY executes print processing by transmitting print data generated by the information processing apparatus 101 to the printing apparatus 151 via a predetermined network.

The information processing apparatus 101 generates print data that the printing apparatus 151 can process. As the information processing apparatus 101, for example, a known arithmetic device such as a Personal Computer (PC), a smartphone, a portable terminal, a laptop, a tablet terminal, or a Personal Digital Assistant (PDA) is used.

The information processing apparatus 101 includes an input interface 102, a Central Processing Unit (CPU) 103, a Read Only Memory (ROM) 104, and a Random Access Memory (RAM) 105. The information processing apparatus 101 further includes an external storage device 106, an output interface 107, a communication unit 109, and a short-range wireless communication unit 110. Also, the information processing apparatus 101 can cause an externally connected display unit 108 to display information associated with printing. The display unit 108 may be formed as a part of the information processing apparatus 101.

The input interface 102 is configured to be able to accept an operation input from a user, and the user can input data or settings necessary for printing, a print instruction, and the like via the input interface 102. As the input interface 102, for example, a known input terminal such as a keyboard, buttons, or a touch panel is used.

The CPU 103 functions as a system controller that performs drive control of the entire system of the information processing apparatus 101. The ROM 104 stores not only the Operating System (OS) but also programs (and additional information such as data tables) necessary for implementing the functions of the CPU 103. The RAM 105 is used as the main memory and the work memory of the CPU 103. As the RAM 105, a Static Random Access Memory (SRAM) or the like is used. The CPU 103 performs execution control of software such as scheduling, task switching, and interrupt processing under the management of the OS while reading out a necessary program from the ROM 104 and deploying it on the RAM 105. At this time, setting information, management data, and the like of the information processing apparatus 101 can be stored in the RAM 105.

The external storage device 106 stores, for example, an application program (to be referred to as "application" hereinafter) configured to execute printing, and a print information generation program that generates print information that can be processed by the printing apparatus 151. Also, the external storage device 106 stores, for example, a control program configured to transmit/receive information to/from an external apparatus (here, the printing apparatus 151) connected via the communication unit 109. Additionally, the external storage device 106 can store various kinds of information needed to execute these programs.

The output interface 107 performs control for causing the display unit 108 to display predetermined information, and outputs, for example, display target information representing contents to be displayed, control information used to implement the display by the display unit 108, state information representing the state of the information processing apparatus 101, and the like. Note that the input interface 102 and the output interface 107 may be integrated, and acceptance of an operation input from the user and display of an output screen may be implemented by a single unit. For example, a software keyboard including numerical value input keys, a mode setting key, an enter key, a cancel key, and a power key may be displayed on the display unit 108, and an operation input from the user may be accepted via the software keyboard.

The display unit 108 includes a Light Emitting Diode (LED), a Liquid Crystal Display (LCD), and the like, and displays data to the user or notifies the user of the state of the information processing apparatus 101.

The communication unit 109 includes a Radio Frequency (RF) circuit and a baseband circuit for executing data communication with the printing apparatus 151, and, in this embodiment, communicates with the printing apparatus 151 via the access point 131. As the access point 131, for example, a known device such as a wireless LAN router that operates in accordance with a wireless communication method complying with the IEEE802.11 standard is used. The communication unit 109 can perform communication by Wi-Fi® but may perform communication by another wireless communication method such as Bluetooth®. The communication unit 109 can also establish direct connection to the printing apparatus 151 based on a protocol such as Wireless Fidelity (Wi-Fi) Direct®. If the printing apparatus 151 includes an access point (not shown), the communication unit 109 may be connected to the access point to establish direct connection to the printing apparatus 151.

If the printing apparatus 151 is located within a predetermined range, the short-range wireless communication unit 110 establishes wireless connection to the printing apparatus 151, thereby executing data communication. The short-range wireless communication unit 110 performs communication by a communication method different from that of the communication unit 109, such as Bluetooth Low Energy (BLE).

The printing apparatus 151 acquires print data from the information processing apparatus 101 and executes print processing based on the print data. As the printing apparatus 151, an inkjet printer or the like is used. However, a printer capable of executing printing of another method such as an electrophotographic method may be used. Also, the printing apparatus 151 may be a multi function peripheral having a plurality of functions such as a copy function, a FAX function, and a print function.

The printing apparatus 151 includes a ROM 152, a RAM 153, a CPU 154, a print engine 155, a communication unit 156, and a short-range wireless communication unit 157. The communication unit 156 includes a radio frequency circuit and a baseband circuit for performing connection to the information processing apparatus 101, and performs communication with the information processing apparatus 101 by a wireless communication method such as Wi-Fi or Bluetooth in correspondence with the communication unit 109 of the information processing apparatus 101. The communication unit 156 is configured like the communication unit 109, and can establish direct connection to the information processing apparatus 101. Note that although the information processing apparatus 101 and the printing apparatus 151 are connected to the access point 131 in this example, these may be connected to different access points connected to a network, and connected to each other via the network.

If the information processing apparatus 101 is located within a predetermined range, the short-range wireless communication unit 157 establishes wireless connection to the short-range wireless communication unit 110 of the information processing apparatus 101, thereby executing data communication. The short-range wireless communication unit 157 performs communication with the information processing apparatus 101 by a wireless communication method such as BLE in correspondence with the short-range wireless communication unit 110 of the information processing apparatus 101. Note that since the amount of data transmitted from the information processing apparatus 101 is generally large, and high-speed large-capacity communication is required, the communication unit 156 can be used rather than the short-range wireless communication unit 157.

The ROM 152, the RAM 153, and the CPU 154 are configured like the ROM 104, the RAM 105, and the CPU 103 of the information processing apparatus 101, respectively, and implement corresponding functions. For example, the RAM 153 is used as the main memory and the work memory of the CPU 154. The RAM 153 is provided with a memory area for storing setting information, management data, and the like of the printing apparatus 151. The RAM 153 stores information necessary for implementing printing by the printing apparatus 151, such as print information received from the information processing apparatus 101. The ROM 152 stores permanent data such as programs to be executed by the CPU 154 (and additional information such as data tables), and an OS program. The CPU 154 performs execution control of software such as scheduling, task switching, and interrupt processing under the management of the OS while reading out a necessary program from the ROM 152 and deploying it on the RAM 153. The CPU 154 functions as a system controller that performs drive control of the entire system of the printing apparatus 151. Note that an external memory such as a Hard Disk Drive (HDD) or a Solid State Drive (SSD) may additionally be connected to the printing apparatus 151, and all/some pieces of information such as the above-described programs and data may be stored in the/these external memories.

The print engine 155 executes printing based on information stored in the RAM 153 and print information received from the information processing apparatus 101, in this embodiment, forms an image on a print medium such as a sheet using a recording material such as ink, and outputs a print result.

Communication between the information processing apparatus 101 and the printing apparatus 151 may be implemented by another mode. For example, the information processing apparatus 101 and the printing apparatus 151 may be connected via a wired line. As still another embodiment, in the system SY, the functions of both the information processing apparatus 101 and the printing apparatus 151 may be formed by an integrated unit. In this case, communication between the information processing apparatus 101 and the printing apparatus 151 is performed via a bus in the unit. Also, a plurality of blocks shown in FIG. 1 may be integrated into one block, and one block may be divided into a plurality of blocks. In addition, a block other than those shown in FIG. 1 may be added, and one or more of the blocks shown in FIG. 1 may be omitted.

Figure 2:
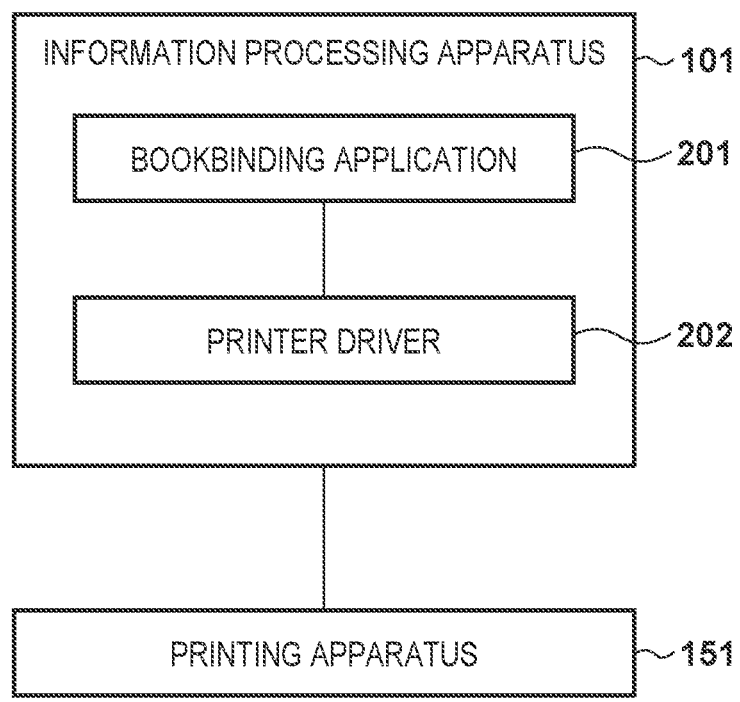
FIG. 2 is a block diagram showing an example of the software configuration of an information processing apparatus.

FIG. 2 is a block diagram showing the software configuration of the information processing apparatus 101. The information processing apparatus 101 includes, as components capable of implementing the functions, a bookbinding application 201 configured to execute processing to be described later, and a printer driver 202 that generates print data that the printing apparatus 151 can process. If the user inputs a print instruction on a screen (to be described later) displayed by the bookbinding application 201, the printer driver 202 receives application data output from the bookbinding application 201 and generates print data. Note that the application data output from the bookbinding application 201 is data for bookbinding, and is data based on the contents of editing executed by the user using the bookbinding application 201. An example of the print instruction on the screen of the bookbinding application 201 is pressing an "OK" button 1009 shown in FIG. 10. When the printer driver 202 transmits the print data generated by the bookbinding application 201 to the printing apparatus 151, the printing apparatus 151 executes print processing. Bookbinding is performed by putting sheets printed by the print processing together into a book.

Note that the bookbinding includes not only printing by the printing apparatus 151 but also generating one or more printed sheets which are formed into a book later, and can additionally include binding the/these sheets into a book by stapling or the like. From this viewpoint, the system SY can also be expressed as a bookbinding system.

(Outline of Bookbinding Application)

Various kinds of processes executed for bookbinding by the bookbinding application 201 are performed by the CPU 103 mainly reading out and executing programs associated with the bookbinding application 201.

Figure 3:
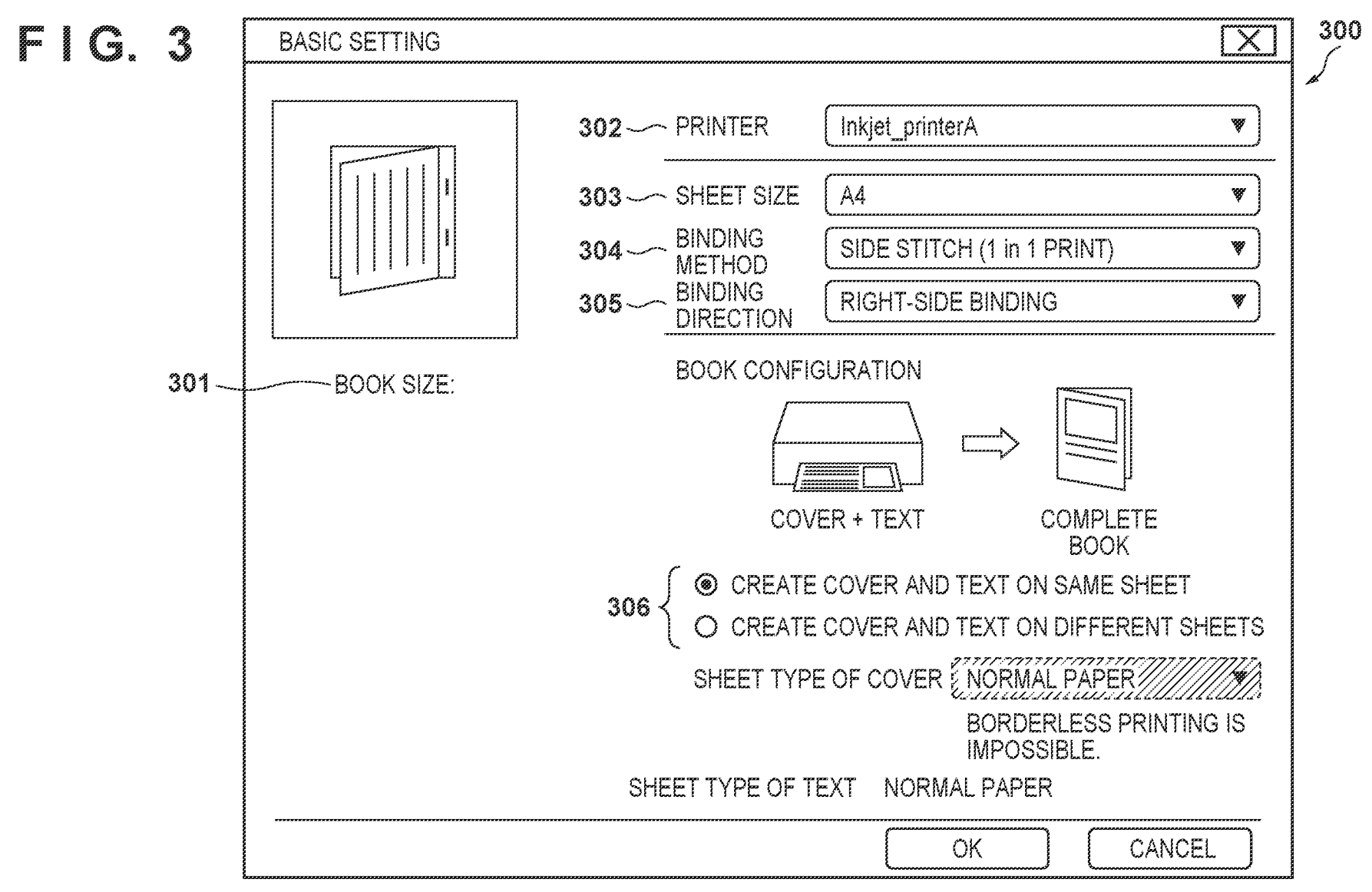

FIG. 3 is a schematic view showing an example of a basic setting screen 300 displayed on the display unit 108 when the CPU 103 of the information processing apparatus 101 executes a program corresponding to the bookbinding application 201 and stored in the ROM 104 or the external storage device 106. In this example, the basic setting screen 300 includes a post-bookbinding image 301, a printer selection region 302, a sheet size selection region 303, a binding method setting region 304, a binding direction setting region 305, and a cover sheet-related setting region 306.

The printer selection region 302 is a region where a printing apparatus to be used to execute printing is selected. If a pull-down button in the printer selection region 302 is pressed, a list of printing apparatuses usable by the information processing apparatus 101 is displayed, and the user can select an arbitrary printing apparatus from the list. As for the list of the printing apparatuses displayed when the pull-down button in the printer selection region 302 is pressed, only printing apparatuses supporting the bookbinding application 201 are preferably displayed. However, the present invention is not limited to this, and all printing apparatuses with which the information processing apparatus 101 can communicate may be displayed.

The sheet size selection region 303 is a region where the size of sheets to be used for bookbinding is selected. If a pull-down button in the sheet size selection region 303 is pressed, a list of sheet sizes that the printing apparatus selected in the printer selection region 302 can support is displayed. The user can select an arbitrary size from the displayed list of sheet sizes. Information of the sheet sizes that the printing apparatus selected in the printer selection region 302 can support is acquired from the printing apparatus via, for example, the printer driver 202.

The binding method setting region 304 is a region where a binding method of a book is set. If a pull-down button in the binding method setting region 304 is pressed, a list of binding methods such as "side stitch" and "saddle stitch" is displayed. Here, in "saddle stitch", bookbinding is performed by binding sheets at the spine portion of a book. In "side stitch", bookbinding is performed by binding sheets at a position a predetermined distance away from the spine portion of a book. For example, if "saddle stitch" is selected, it is assumed that the sheets are folded in half, and thus a 2-in-1 print setting can be selected automatically. At this time, a print setting other than 1-in-1, for example, a print setting such as 4-in-1 may selectably be displayed. Note that if "side stitch" is selected, the 1-in-1 print setting can be selected automatically. In this case as well, print settings such as 2-in-1 and 4-in-1 may selectably be displayed.

Note that concerning the print setting, in this specification, a setting of printing images of K pages on one surface of a single sheet is expressed as K-in-1 (K is an integer of 1 or more). If K is 2 or more, that is, if page data of two or more pages are printed on one surface, the image of each page is reduced.

The binding direction setting region 305 is a region where a binding direction of a book is set. If a pull-down button in the binding direction setting region 305 is pressed, for example, "right-side binding" and "left-side binding" are selectably displayed. Here, in "right-side binding", bookbinding is performed by binding the right side of a front cover (the front surface of the cover). In "left-side binding", bookbinding is performed by binding the left side of the front cover. Right-open corresponds to right-side binding, and left-open corresponds to left-side binding. The setting in this region determines whether the pages of a book to be created advance from right to left or from left to right. Additionally, "upper binding" may be further selectably displayed. In "upper binding", bookbinding is performed by binding the upper portion of the cover. "Binding direction" in the binding direction setting region 305 may be expressed as "open direction" or the like.

The cover sheet-related setting region 306 is a region where how to make a cover sheet is set. For example, radio buttons that allow the user to select one of an item for creating covers and text by the same type of sheets and an item for creating covers and text by different types of sheets are displayed. In the setting region 306, when creating covers and text by the same type of sheets, the sheet type (for example, "normal paper" or the like) of the text is set as the sheet type of the covers. Hence, a region where the sheet type of covers can be selected can be displayed in a gray-out state to disable selection of the region.

On the other hand, in the setting region 306, when creating covers and text by different types of sheets, the region where the sheet type of covers can be selected is activated. If a pull-down button in the region where the sheet type of the covers is set is pressed, a list of selectable sheet types (for example, normal paper, glossy paper, and the like) is displayed. For example, if "normal paper" is selected, a character string "borderless printing is impossible" can be displayed, and if "glossy paper" is selected, a character string "borderless printing is possible" can be displayed.

In addition, necessary information may be set for each sheet type, and a character string corresponding to the sheet type selected by the user may be displayed. Also, if the setting of creating covers and text by different types of sheets is selected, a message such as "it is necessary to print by setting different sheets for cover/text" may be displayed.

When "OK" is pressed in the basic setting screen 300 shown in FIG. 3, the screen transitions to an edit screen. The edit screen may be different in accordance with the setting items such as the binding method and whether to set the sheet type of covers to be the same as that of text. Examples of the edit screen corresponding to the basic settings will be described below.

[Case in which Side Stitch is Selected and Covers and Text are Created by Same Type of Sheets]

Figure 4:
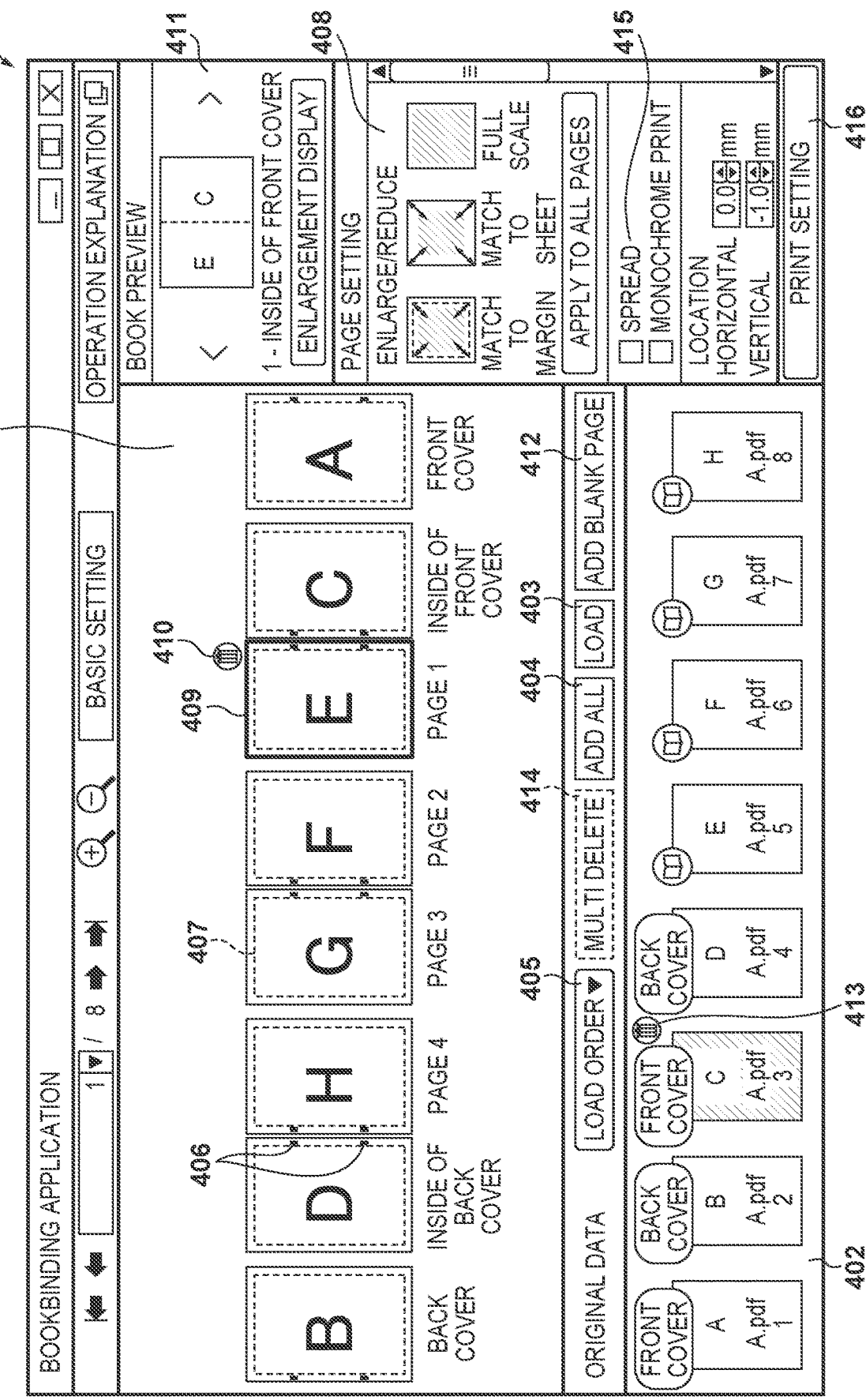
FIG. 4 is a schematic view showing an example of an edit screen in the bookbinding application.

FIG. 4 shows an example of an edit screen 400 when the binding method is side stitch (1-in-1), right-side binding is selected, and the setting of using the same type of sheets for the covers and text is made. FIG. 4 shows a state in which page data for eight pages (from a page where "A" is written to a page where "H" is written) have already been loaded.

Here, assume that page data corresponds to image data corresponding to each page, and all page data of a plurality of pages are included in the concept of original data. Before an original (document) is loaded, an edit region 401 and an original data region 402 are in a predetermined state (for example, a blank state) in which the user can recognize that no original is loaded. For example, a message such as "please load original data to be put in a book" may be displayed in the edit region 401, and a message that notifies the user of a method of loading data may additionally be displayed. Also, such a message may be displayed in the original data region 402 or may be notified by another method such as display of a dialog. Note that as for the original data, data of only one page may be loaded, or data of a plurality of pages may be loaded.

When a "load" button 403 is pressed, for example, a file selection dialog is displayed. If two or more files (original data) are displayed, the user can select an arbitrary one of these files. Then, page data included in the selected file is deployed in the original data region 402. As will be described later in detail, concerning the page data included in the file, allocation (to be referred to as "book allocation" hereinafter) based on a page order and setting contents in the basic setting screen 300 is performed, and the result can be displayed in the edit region 401.

As shown in FIG. 4, the book allocation can be performed such that, for example, page data of the first to fourth pages are set as "front cover", "back cover", "inside of front cover (back surface of front cover)", and "inside of back cover (back surface of back cover)", respectively, and page data of the subsequent pages are set as text. In the thus deployed file, the first page (page data where "A" is written) is allocated to "front cover", and the second page (page data where "B" is written) is allocated to "back cover". Similarly, the third page (page data where "C" is written) is allocated to "inside of front cover", and the fourth page (page data where "D" is written) is allocated to "inside of back cover".

That is, the bookbinding application 201 generates book data that is the result of allocating the page data included in the original data. The book data includes page data corresponding to a plurality of pages that forms a book, and the bookbinding application 201 displays the preview image of each page in the edit region 401 shown in FIG. 4 based on the generated book data. In other words, it can be said that the book data is original data in which the page data are allocated and rearranged. The book data may be expressed as page data for a book or page data for bookbinding, or simply as bookbinding data.

Note that the page data of the first and second pages may be allocated to "front cover" and "inside of front cover", and the page data of the last page and the second page from the last may be allocated to "back cover" and "inside of back cover".

The example of FIG. 4 (and some examples to be described later) show a case of right-side binding so that the front cover is displayed at the rightmost end, and the back cover is displayed at the leftmost end. In a case of left-side binding, the front cover is displayed at the leftmost end, and the back cover is displayed at the rightmost end.

Note that when deploying the contents of the file in the original data region 402, for example, a confirmation message such as "do you want to perform automatic page allocation?" may be displayed to allow the user to select whether to execute book allocation. If the user selects execution of book allocation, the execution result of the book allocation is displayed in the edit region 401. If execution of book allocation is not selected, the edit region 401 may remain blank. Alternatively, the page data included in the selected file may only be deployed in the original data region 402 without executing book allocation regardless of selection of the user. Note that even if book allocation is not executed, book allocation may be performed in the order of the pages included in the file by pressing an "add all" button 404.

Note that if a plurality of files are read out, all page data included in the plurality of files are deployed in the original data region 402. At this time, the order of the page data to be deployed can be decided by a pull-down menu 405. If "load order" is selected as shown in FIG. 4, the page data are deployed in the original data region 402 such that the page data of the selected file are displayed sequentially from the left side to the right side.

On the other hand, if, for example, "file name order" (not shown) is selected, the page data are deployed in ascending order (or descending order) of file names. For example, if a file with a name "A.pdf" is opened after a file with a name "B.pdf", and "load order" is selected, the page data of "A.pdf" is displayed on the right side of the position where the page data of "B.pdf" is displayed. If "file name order" is selected, the page data of "B.pdf" is displayed on the right side of the position where the page data of "A.pdf" is displayed even if "B.pdf" is opened first.

Note that the sort order is not limited to the load order and the file name order, and various orders such as the order of the file creation date (update date) and the order of the use frequency in this application can be used.

In the edit region 401, the images of the page data are displayed in the order of the pages of the book after bookbinding (after the state of a book is obtained). At this time, the images of the page data are displayed such that the distance between two adjacent pages that are displayed in a spread is shorter than the distance between two other adjacent pages that are not displayed in a spread. This allows the user to readily visually recognize a page that forms a spread of a book and a page that does not form a spread. For example, in the example of FIG. 4, the distance between the page where "C" is written and the page where "E" is written is sufficiently short. Hence, the user can easily grasp that the page where "C" is written and the page where "E" is written form a spread. On the other hand, the distance between the page where "E" is written and the page where "F" is written is longer than the distance between the page where "C" is written and the page where "E" is written. Hence, the user can easily grasp that the page where "F" is written and the page where "E" is written do not form a spread. In this way, the images of all pages are displayed in the edit region 401 based on the page data of the pages included in the book data.

The example of FIG. 4 shows a mode in which all pages included in the book data are displayed. In this case, if the number of pages increases, the size of each page becomes small. To cope with this, the bookbinding application 201 is preferably configured to enlarge/reduce each page. If it is difficult to display all pages in the edit region 401, the display range may be changed by, for example, displaying a scroll bar or the like in the lower portion of the edit region 401.

If side stitch is selected, binding positions 406 by a staple or the like are displayed in the edit region 401. The binding positions 406 are preferably displayed in a color (for example, red) different from that of remaining display such that the user can easily recognize these. The display of the binding positions 406 may be printed on sheets. This allows the user to bind printed sheets at the printed binding positions 406 using a stapler and relatively easily make a book.

Also, in the edit region 401, a boundary line 407 indicating the boundary between a print region and a margin region is displayed. For example, in page setting 408, the user does a setting representing whether to enlarge/reduce original data in accordance with the margin or sheet or display the original data in a full scale and settings for position adjustment in the vertical and horizontal directions. Each page data is laid out in a page and the boundary line 407 is displayed based on the setting values of the page setting 408 input by the user. Note that as for the vertical and horizontal positions, if the setting value is a negative value, the position of the original data is moved and adjusted upward or leftward. If the setting value is a positive value, the position of the original data is moved and adjusted downward or rightward. This allows the user to make settings such that the page data is laid out in a page in a desired mode.

These settings may be applied on a page basis. For example, in a state in which the page where "E" is written is selected in the edit region 401, if the setting values are input in the page setting 408, the setting values are applied to the selected page. If "apply to all pages" is selected in the page setting 408, the setting values are collectively applied to all pages. At this time, as shown in FIG. 4, a page frame 409 of the page where "E" is written may be highlighted. This allows the user to visually recognize the selected page and recognize that the settings for the specific page are being changed. In addition, the user can delete the page from the edit region 401 by pressing, for example, an icon 410.

Also, if a "spread" checkbox 415 is selected (if a check mark is input), a spread attribute can be set for one page data.

Figure 5:
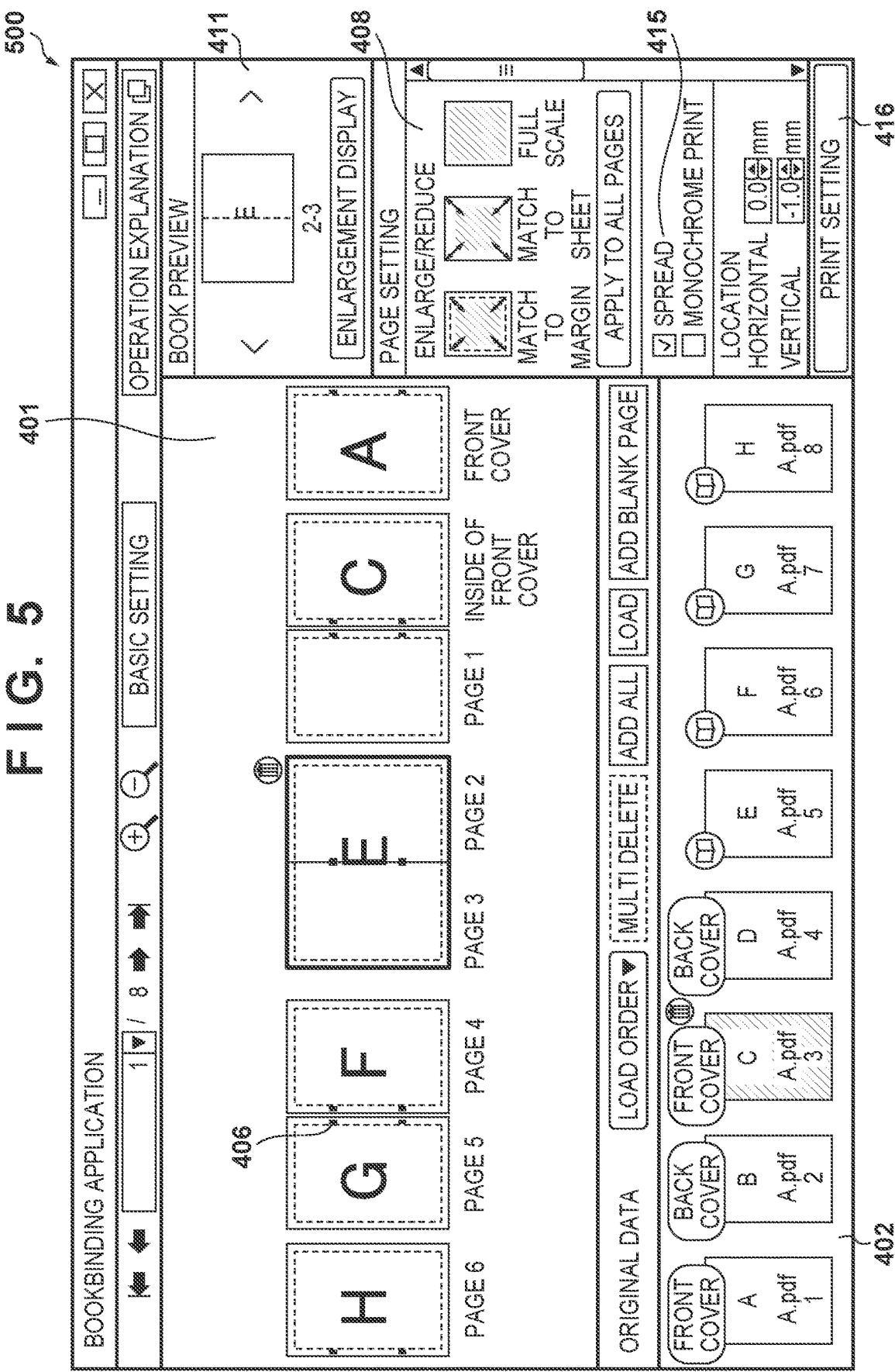
FIG. 5 is a schematic view showing an example of the edit screen in the bookbinding application.

FIG. 5 shows an example of an edit screen 500 in a case in which the "spread" checkbox 415 is selected in a state in which the page where "E" is written is selected. For example, if the "spread" checkbox 415 is selected, a spread attribute is imparted to page data corresponding to the selected page, and the page data is allocated to a region corresponding to two pages on the edit region 401.

As another embodiment different from the example shown in FIGS. 4 and 5, an example in which the "spread" checkbox 415 is selected in a state in which an even-numbered page of the text (for example, a page on the right side of a spread in right-side binding or a page on the left side of a spread in left-side binding) is selected will be described here. In this example, page data allocated to the selected page is displayed at the center of the spread including the selected page, and the page data are reallocated such that each page after the selected page is shifted backward by one page. That is, the bookbinding application 201 generates a new spread region by adding one page after the selected page, and lays out the page data of the selected page at the center of the new spread region.

On the other hand, if an odd-numbered page of the text (for example, a page on the left side of a spread in right-side binding or a page on the right side of a spread in left-side binding), like the page where "E" is written in FIG. 4, is selected, the page next to the selected page is included in a spread different from the spread including the selected page. For this reason, by simply adding one page after the selected page to generate a new spread region and allocating one page data to the new spread region, the page data cannot be displayed as a spread. Therefore, if the "spread" checkbox 415 is selected in the state in which the odd-numbered page of the text is selected, as shown in FIG. 5, one page is added after the selected page and before the selected page, and the page data are reallocated such that each page after the selected page is shifted backward by two pages.

If the "spread" checkbox 415 is selected in a state in which the odd-numbered page is selected, a message for notifying the user that one page is added before the selected page may be displayed. If the user approves addition of the page, a spread attribute is set for the selected page data, and the selected page data may be laid out over a plurality of pages. This can prevent addition of a page unintended by the user. Note that if the user does not approve addition of the page, setting of the spread attribute may be canceled, or a space corresponding to one page may be added after the selected page, and the selected page may be allocated to a region corresponding to two pages.

Also, if the "spread" checkbox 415 is selected in a state in which the odd-numbered page is selected, instead of displaying the message, a space corresponding to one page may be added after the selected page, and the selected page may be allocated to a region corresponding to two pages. At this time, a message representing that the page data of the selected page is not laid out in the spread region in that state may be displayed.

If selection of the "spread" checkbox 415 is canceled after the spread attribute is set for the page data (if input of the check mark is canceled), the spread attribute of the page data is canceled. As a result, the (preceding and succeeding) pages added at the time of allocation are deleted, and the pages after the pages are reallocated. At this time, for example, a message for causing the user to confirm whether to delete a page such as a blank page added when allocating the odd-numbered page to a spread may be displayed.

If horizontally long page data is allocated (for example, dragged and dropped) to the edit region 401, the spread attribute may be set for the page data without interposing an operation input by the user. In this case, a check mark is input to the "spread" checkbox 415 at the early stage of allocation. Also, if the insertion position of the page data is an odd-numbered page, a blank page or the like may be inserted before the page, as described above, or predetermined error display or the like may be performed.

If selection of the "spread" checkbox 415 is canceled after the spread attribute is set for the horizontally long page data, and the page data is allocated to the spread region, the spread attribute of the horizontally long page data is canceled. As a result, the horizontally long page data can be allocated to one page that forms a spread (for example, by reduction or rotation). Alternatively, the horizontally long page data may be allocated to one page, like a vertically long page, without setting the spread attribute for the horizontally long page data.

Referring back to FIG. 4, for the selected page, the image of the spread including the page after bookbinding is displayed as a book preview 411. This allows the user to relatively easily recognize the state of the selected page after bookbinding. Also, if "<" or ">" displayed together with the book preview 411 is selected, the preview of an adjacent spread is displayed.

Interlocked/synchronized with this, the selected page may be shifted or moved, or may not.

Also, the user can operate the page data deployed in the original data region 402 on a page basis. For example, the user can select one page data in the original data region 402 and drag and drop it to the edit region 401. Thus, the selected page data is added as one page of the book. In the example shown in FIG. 4, the page where "C" is written is selected in the data deployed in the original data region 402.

The thus selected page data is inserted to an arbitrary position in the edit region 401 by drag and drop and incorporated in the book data as a page corresponding to the position. For example, consider a case in which some page data is inserted by drag and drop in a predetermined range between the page where "F" is written and the page where "G" is written in the edit region 401. In this case, the bookbinding application 201 generates book data in which page data where "C" is written is inserted between the page data of "F" and the page data of "G". If such page data is inserted, the spread relationship is reconstructed by performing reallocation based on the book data after the insertion. That is, the page of "F" and the newly added page of "C" have the spread relationship, and the page of "G" has the spread relationship with the page of "H" due to addition of the page of "C".

Also, if an "add blank page" button 412 is pressed, a blank page is added. For example, if the "add blank page" button 412 is pressed in a state in which the page where "C" is written is selected, a blank page is added between the page where "C" is written and the page where "E" is written. In this case, the bookbinding application 201 generates book data including blank page data between the page data of "C" and the page data of "E". The mode of blank page addition can be changed by a setting. For example, the blank page may be added before the selected page. If two pages are selected, the blank page may be added between these. Hence, for example, if the inside of the front cover should be a blank page, or in accordance with the user's preferences or the like, the blank page can be added to an arbitrary position in the book.

If the page data in the original data region 402 are used in the edit region 401, information for specifying it is preferably added at the upper left position of each data. As shown in FIG. 4, for example, the page data where "A" is written and the page data where "C" is written are used for the front cover ("C" is used for the inside of the front cover). Also, the page data where "B" is written and the page data where "D" is written are used for the back cover ("D" is used for the inside of the back cover). Other page data are used for the text. This allows the user to relatively easily recognize whether the use state of each page data is appropriate, for example, whether page data that should be included in the book data is not used or whether page data that should not be included in the book data is used.

Also, in the original data region 402, the user can delete page data that is not to be used in the book. For example, a deletion icon 413 is displayed at the upper right position of page data in the selected state. The user can delete the selected page data from the original data region 402 by selecting the icon 413. This can prevent an edit operation from becoming cumbersome because many data that are not to be used exist in the original data region 402.

Furthermore, the user can select a plurality of data and collectively operate these in the original data region 402. For example, assume that in a state in which the page data where "C" is written and the page data where "D" is written are selected, the page data are collectively inserted to the edit region 401 by drag and drop. In this case, these page data are incorporated in the book data as two successive pages. The same applies to a case in which three or more page data are selected.

If a "multi delete" button 414 is pressed in a state in which a plurality of page data are selected, the plurality of page data can collectively be deleted from the original data region 402. Note that if one data is selected or no data is selected, the "multi delete" button 414 is displayed in a gray-out state, and pressing of the "multi delete" button 414 can be limited.

If the print setting button 416 is pressed after editing of the book is completed in the above-described way, printing for a book (so-called bookbinding printing) is executed. That is, the bookbinding application 201 outputs application data based on the book data including the page data arranged in a desired order by the above-described editing. The printer driver 202 generates print data based on the output application data.

Note that in a case of side stitch (1-in-1), letting n be an integer of 1 or more, double-sided printing is executed such that the (2n−1) the page and 2nth page have the front-back relationship. Also, double-sided printing is executed such that the front cover and its inside have the front-back relationship, and the back cover and its inside have the front-back relationship.

[Case in which Saddle Stitch is Selected and Covers and Text are Created by Same Type of Sheets]

Figure 6:
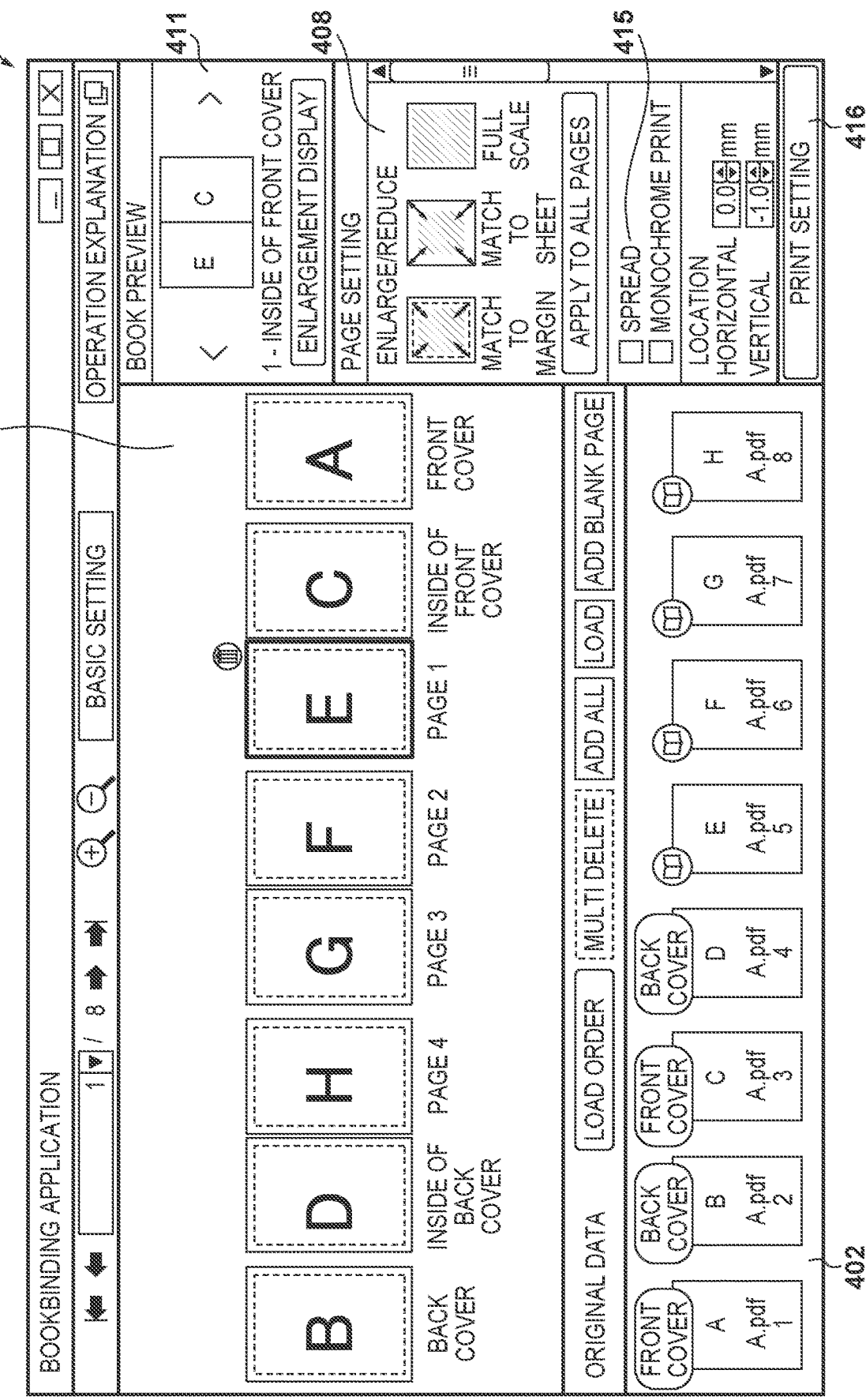
FIG. 6 is a schematic view showing an example of the edit screen in the bookbinding application.

FIG. 6 shows an example of an edit screen 600 when the binding method is saddle stitch (2-in-1), and the setting of using the same type of sheets for the covers and text is made, like FIG. 4. In the case of saddle stitch, the binding positions are between the pages. Hence, as is apparent from FIG. 6, the marks indicating the binding positions are not necessary and are not displayed in this example. When printing on a paper surface, the marks of binding positions may be displayed.

If the binding method is saddle stitch (2-in-1), 2-in-1 double-sided printing is performed. Hence, the number of pages per sheet is four. Therefore, if the number of pages added to the edit region 401 is not a multiple of 4, a page such as a blank page can be added to, for example, the end such that the total number of pages is a multiple of 4.

If the binding method is saddle stitch (2-in-1), and right-side binding is selected, letting N be the total number of pages and m be an integer of 0 or more, printing is performed such that the front surface of a certain sheet includes the (N/2+2m+2)th page on the right side and the (N/2−2m−1)th page on the left side. In addition, printing is performed such that the back surface includes the (N/2−2m)th page on the right side and the (N/2+2m+1)th page on the left side. For example, if N=8, a front surface including the sixth page on the right side and the third page on the left side and a back surface including the fourth page on the right side (the back side of the third page) and the fifth page on the left side (the back side of the sixth page) are printed on both surfaces of one sheet. Similarly, a front surface including the eighth page on the right side and the first page on the left side and a back surface including the second page on the right side (the back side of the first page) and the seventh page on the left side (the back side of the eighth page) are printed on both surfaces of another sheet. In addition, a front surface on which the back cover is laid out on the right side and the front cover is laid out on the left side and a back surface on which the inside surface of the front cover is laid out on the right side and the inside surface of the back cover is laid out on the left side are printed on both surfaces. The same applies to left-side binding except that the left/right relationship is reversed.

[Case in which Side Stitch is Selected and Covers and Text are Created by Different Types of Sheets]

Figure 7:
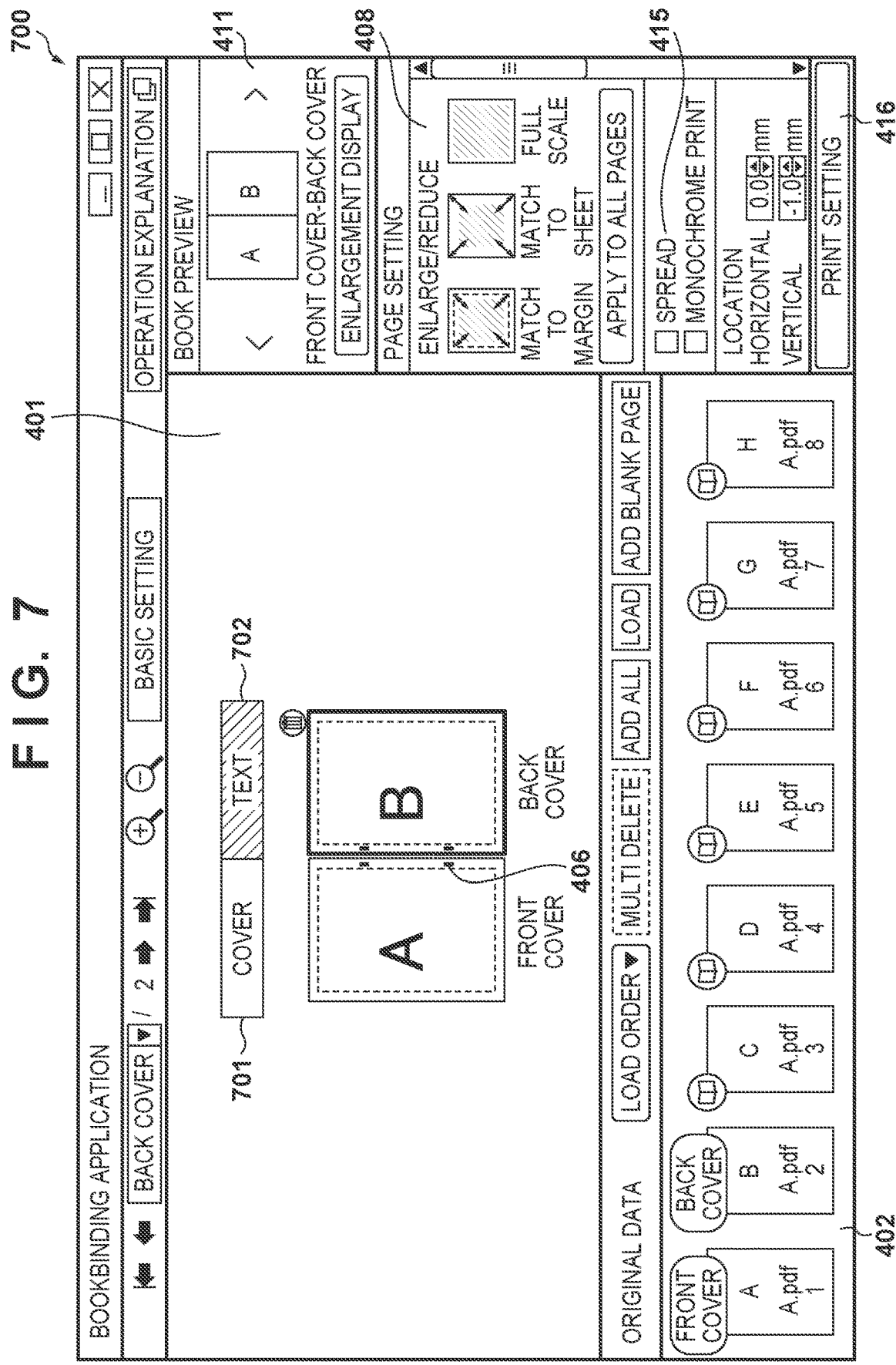
FIG. 7 is a schematic view showing an example of the edit screen in the bookbinding application.
Figure 8:
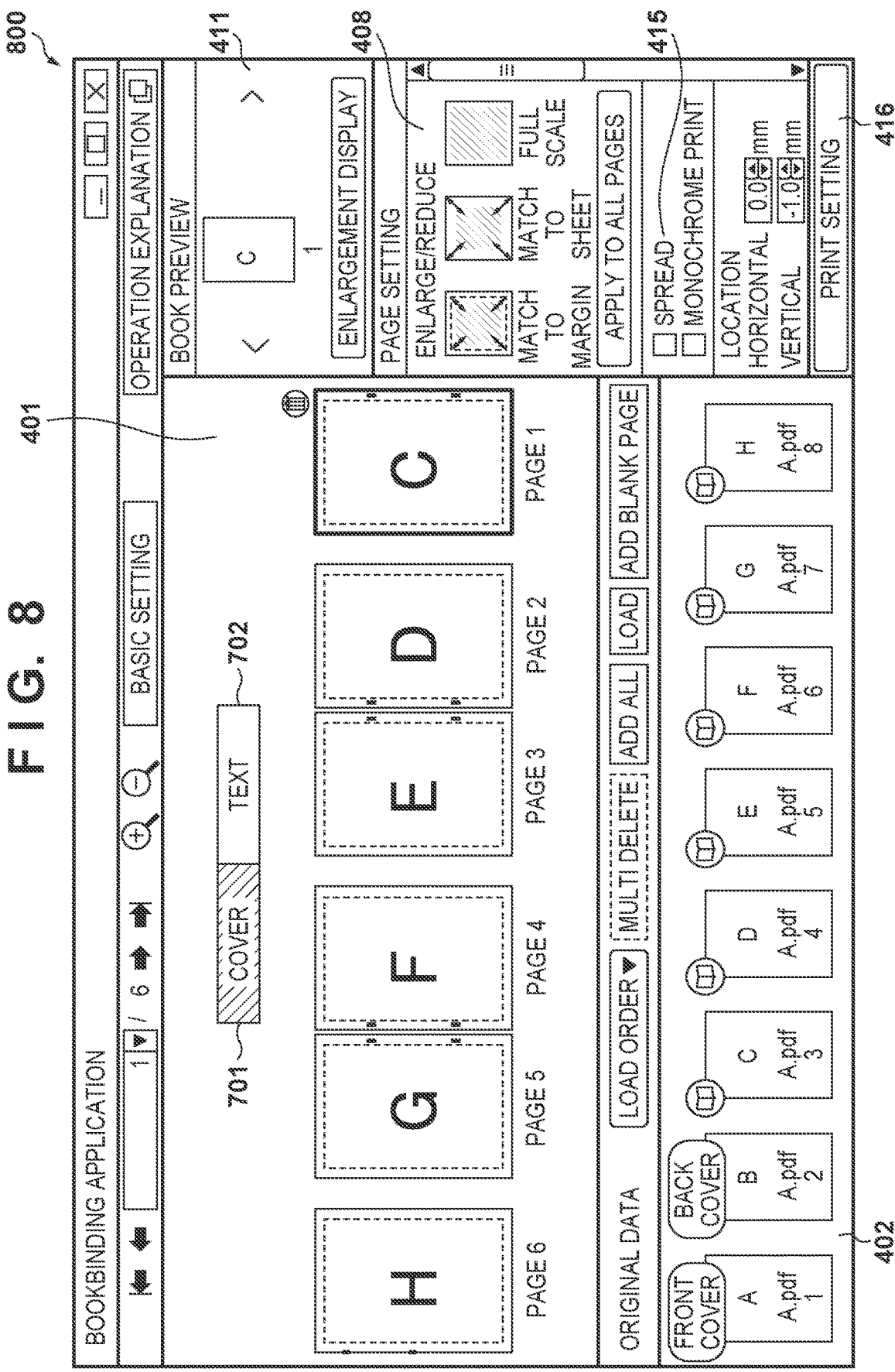
FIG. 8 is a schematic view showing an example of the edit screen in the bookbinding application.

FIGS. 7 and 8 show examples of edit screens 700 and 800, respectively, when the binding method is side stitch (1-in-1), and the setting of using different types of sheets for the covers and text is made. When using different types of sheets for the covers and text, the cover edit screen 700 shown in FIG. 7 and a text edit screen 800 shown in FIG. 8 are used such that editing and printing can separately be executed for the covers and text. That is, the user individually issues a cover print instruction and a text print instruction to the bookbinding application 201.

If the cover edit screen 700 and the text edit screen 800 are separately provided, a cover selection button 701 and a text selection button 702, which are configured to switch between these are displayed in, for example, the edit region 401. If the cover selection button 701 is selected, the cover edit screen 700 is displayed. If the text selection button 702 is selected, the text edit screen 800 is displayed. Note that the buttons 701 and 702 may be displayed outside the edit region 401, or the screens 700 and 800 may selectively be switched by, for example, a tab method.

In the cover edit screen 700, the front cover and the back cover are displayed. The front cover and the back cover are displayed in a mode in which the book is viewed from the spine side. That is, in right-side binding, the front cover is displayed on the left side, and the back cover is displayed on the right side. On the other hand, in left-side binding, the front cover is displayed on the right side, and the back cover is displayed on the left side. Hence, if side switch is used, the binding positions 406 are displayed. In the cover edit screen 700, the binding positions 406 on the front cover are displayed at positions close to the back cover, and the binding positions 406 on the back cover are displayed at positions close to the front cover.

As described above, in the cover edit screen 700, the positional relationship between the front cover and the back cover is different from those in the edit screens 400 to 600 (see FIGS. 4 to 6) in which the covers and text are collectively edited, and the left-and-right positional relationship is reversed. According to this display mode, the user can relatively easily recognize how the book after bookbinding looks from the spine side when the book is opened.

In the above-described example, the inside surface of the front cover or the inside surface of the back cover is not used (that is, the inside surface is blank). However, these surfaces may be used. If the inside surface of the front cover or the inside surface of the back cover is used, in the cover edit screen 700, for example, the page data of the inside of the front cover can be displayed next to the page data of the front cover, and the page data of the inside of the back cover can be displayed next to the page data of the back cover. For example, in the example shown in FIG. 7, the page data of the inside of the front cover can be displayed on the left side of the page data of the front cover, and the page data of the inside of the back cover can be displayed on the right side of the page data of the back cover.

Also, as shown in FIG. 8, in the text edit screen 800, the page data of text except for the front cover and the back cover (and their inside surfaces) is displayed in the edit region 401. The text edit screen 800 is similar to FIG. 4 except that the page data of the front cover, the back cover, and their inside surfaces are not included.

[Case in which Saddle Stitch is Selected and Covers and Text are Created by Different Types of Sheets]

An edit screen displayed when saddle stitch is selected, and the setting of using different types of sheets for the covers and text is made is similar to FIG. 7 or 8 except that the marks of the binding positions are not displayed. In saddle stitch, the number of pages needs to be a multiple of 4. However, if different types of sheets are used for the covers and text, the number of pages of the text needs to be a multiple of 4. That is, in the above-described example, adjustment is performed such that the total number of pages of the covers and text is a multiple of 4. In this example, however, adjustment is performed so that the number of pages of only the text is a multiple of 4. As a result, if the back surfaces of the covers are printed by single-sided printing, the total number of pages of the covers and text is not a multiple of 4 (when a is an integer, the total number of pages is 4a+2). Hence, for example, if the text includes data of six pages, two blank pages are inserted such that the number of pages of the text is a multiple of 4.

Figure 9:
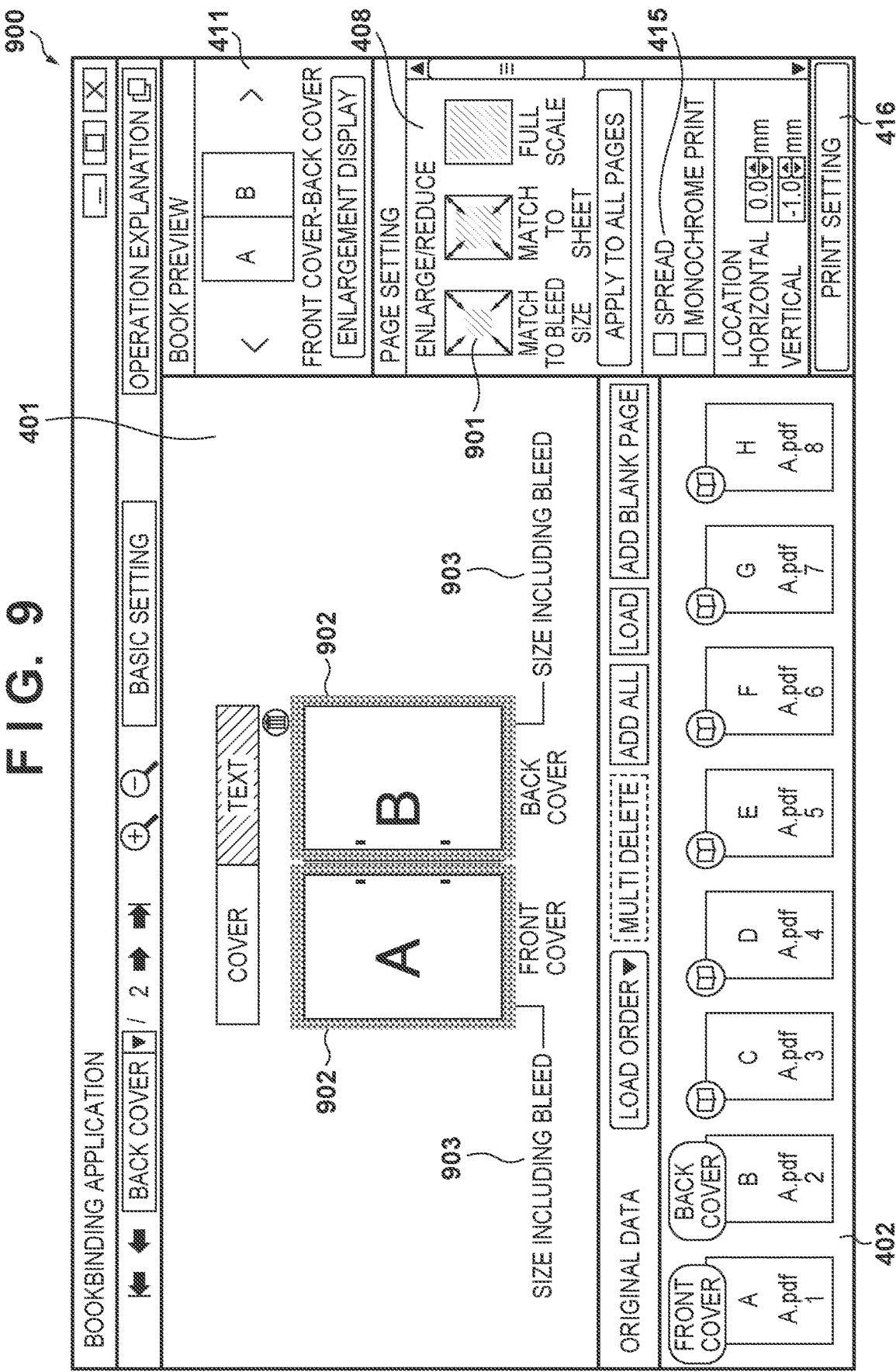
FIG. 9 is a schematic view showing an example of the edit screen in the bookbinding application.

If the setting of using different types of sheets for the covers and text is done, borderless printing of the covers can be performed using, for example, glossy paper. FIG. 9 shows an example of an edit screen 900 in this case. When performing borderless printing, so-called "bleed" needs to be performed such that the print target image has a size larger than the size of finish. Therefore, if paper such as glossy paper that can undergo borderless printing is selected, a region 902 of a size including bleed and an explanation 903 can be displayed. In addition, an option 901 used to match the image with the size including bleed is displayed as one mode of page data enlargement/reduction. This allows the user to implement cover creation by borderless printing by a relatively simple operation.

After the editing of the book is thus completed, printing of the book is executed by pressing a print setting button 416. That is, the bookbinding application 201 outputs application data based on the book data obtained by the above-described editing, and the printer driver 202 generates print data based on the output application data.

When printing the covers and text on the same type of sheets, the application data includes both the pages laid out in the covers and the pages laid out in the text. On the other hand, when printing the covers and text on different types of sheets, the covers and text are printed separately. For this reason, a message used to select the covers or text as a print target can be displayed on a predetermined screen. If the user instructs printing in a state in which the covers are selected, the application data includes only page data laid out in the covers, and the printer driver 202 generates print data for the covers. On the other hand, if the user instructs printing in a state in which the text is selected, the application data includes only page data laid out in the text, and the printer driver 202 generates print data for the text.

(Print Settings)

FIG. 10 shows an example of a print setting screen 1000 that is displayed when the print setting button 416 is pressed after the above-described edit processing (see FIG. 4 and the like) is completed in a state in which the basic settings are done in the basic setting screen 300 shown in FIG. 3. The print setting screen 1000 includes regions 1001 and 1002, a number-of-print-copies setting region 1003, and a region 1004 for setting a print range.

The regions 1001 and the region 1002 are regions for presenting information set in the basic setting screen 300. To change information in the region 1001 and the region 1002, the user presses "cancel" to return to the edit screen and also presses the "basic setting" button in the edit screen, thereby returning to the basic setting screen 300 and performing the change processing.

The number-of-print-copies setting region 1003 is a region for setting the number of copies of the book to be created. The region 1004 is a region for setting whether to print all the text and the covers or print only some of the pages. For example, if the user selects a radio button corresponding to "covers and text", all pages are collectively printed. If the text and the cover are created using different types of sheets, the display "covers and text" is divided into two items "text" and "covers". It is therefore possible to select a mode in which the whole text is collectively printed (a mode in which the covers are not printed) and a mode in which all the covers are collectively printed (a mode in which the text is not printed).

On the other hand, if a radio button corresponding to "page designation" is selected, only some pages are printed. Note that numerical values "(1-8)" displayed on the right side of "page designation" indicate the number of pages of the book. In this case, the print target range includes first to eighth pages. Also, the number of sheets is determined in accordance with settings such as the total number of pages and the binding method, and the pieces of information are displayed in the region 1005. This allows the user to relatively easily recognize the number of sheets to be set in the printing apparatus 151.

It is possible to designate sheet numbers and execute printing of some pages, as described above. In printing for a book, the settings are cumbersome, and printing may be performed in a page mode different from user's assumption.

To prevent this, in this embodiment, a setting screen that allows the user to intuitively select pages to be printed is used.

Figure 11A:
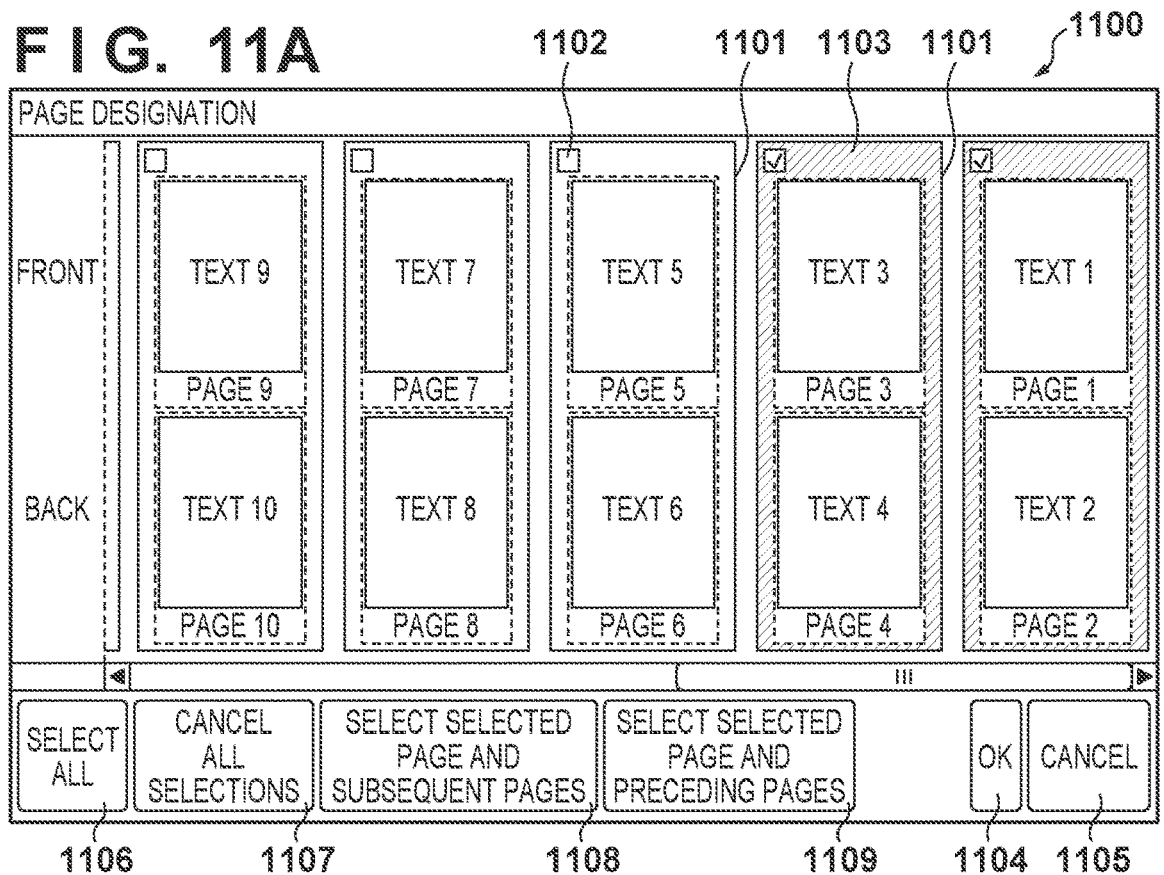
FIG. 11A is a schematic view showing an example of a setting screen for page designation printing.
Figure 11B:
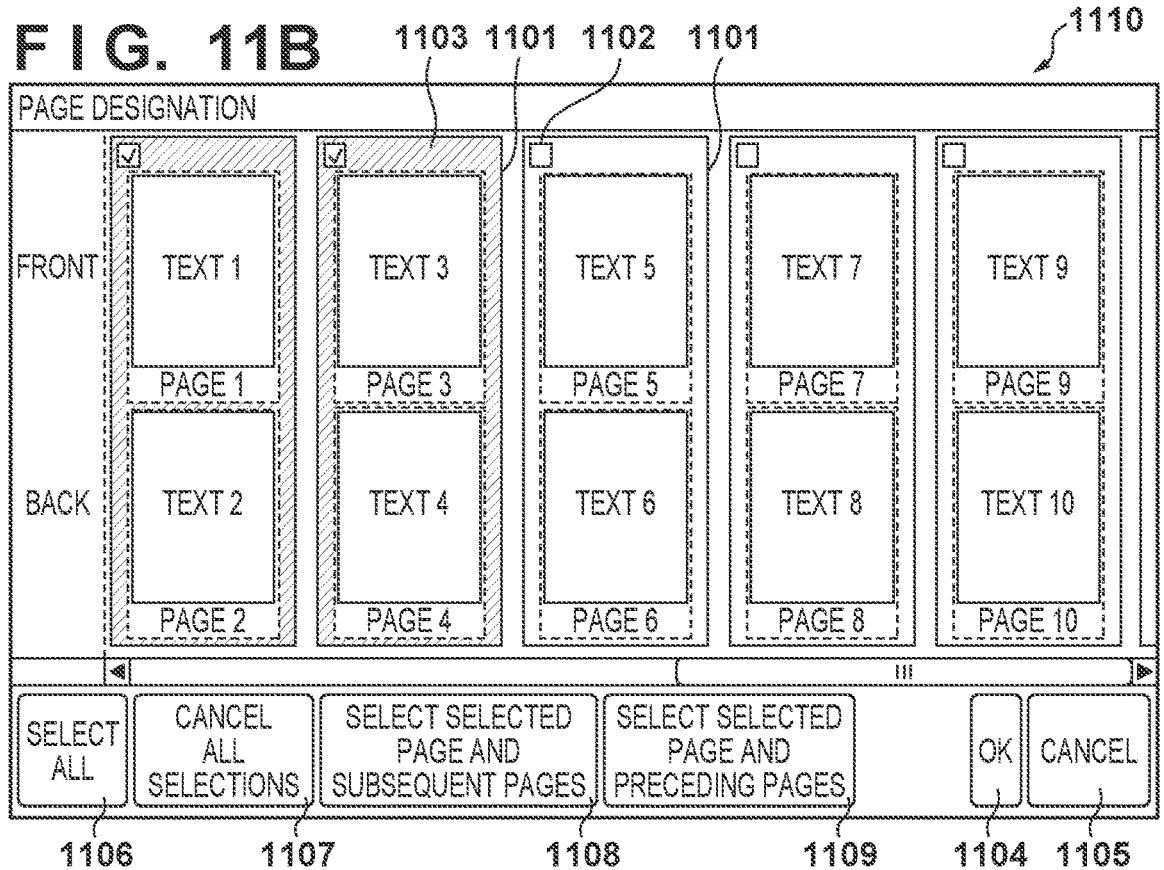
FIG. 11B is a schematic view showing an example of the setting screen for page designation printing.

FIG. 11A shows an example of a setting screen 1100 for page designation printing, which is displayed when a "select" button 1006 shown in FIG. 10 is pressed. Here, to facilitate understanding, assume that a book with 40 pages is printed.

In the setting screen 1100, a page layout is displayed for each sheet. That is, the layout of page data to be printed on the front surface and the back surface of a sheet is displayed in a frame 1101 representing the sheet such that the user can recognize page data allocated to each sheet. For example, in the example shown in FIG. 11A, page data with "text 3" written on the front surface and page data with "text 4" written on the back surface are vertically arranged and laid out. That is, the contents of page data selected from original data are displayed.

Note that letting X be an integer of 1 or more, "text X" in FIG. 11A and subsequent drawings is an expression for convenience's sake, and in fact, the preview screen of the contents of the page can be displayed.

A preview image displayed in the setting screen shown in FIG. 11A and the like indicates a print result of a sheet that forms a book data and can therefore be called a sheet preview image. The sheet preview image is generated based on a plurality of page data and print setting information.

The difference between the edit screens shown in FIGS. 4 to 9 and the setting screens shown in FIGS. 11A to 13B will be described here. It can be said that the edit screens shown in FIGS. 4 to 9 show page preview images based on page data arranged in the order of pages that appear when the user turns over the pages of the book printed and bookbound. On the other hand, it can be said that the setting screens shown in FIGS. 11A to 12B (to be described later) show sheet preview images representing a result of laying out page data on a sheet basis such that the contents of page data appear in the order of pages when the user turns over the pages of the book printed and bookbound.

For example, if saddle stitch is set, in the edit screen 600 shown in FIG. 6, page preview images are arranged in accordance with the order of pages (that is, the order of the first page, the second page, . . . ) that appear when the user turns over the pages of the printed book. On the other hand, if saddle stitch is set, the page data are laid out in an order different from the order of pages (that is, the order of the first page, the second page, . . . ) that appear when the user turns over the pages of the printed book. For example, the page data of the first page and the 40th page are laid out on the front surface of the first sheet, and the page data of the second page and the 39th page are laid out on the back surface of the first sheet. As described above, preview images to be displayed are different between the edit screens and the setting screens.

In the setting screen 1100 for page designation printing, a checkbox 1102 is provided for each frame 1101. If a check mark is set in the checkbox 1102, the corresponding sheet is selected as a print target.

In the example shown in FIG. 11A, the checkbox 1102 is displayed in the frame 1101. However, it may be displayed outside the frame 1101 or at any position on the line of the frame 1101. Another interface replacing the checkbox 1102 may be used. If a check mark is input to the checkbox 1102, for example, the color of the region in the frame 1101 corresponding to the checkbox 1102 preferably changes such that the user can recognize that the frame 1101 is selected. The selected frame 1101 is highlighted by solid fill, as indicated by a region 1103 in FIG. 11A. If an "OK" button 1104 is pressed in this state, print settings for the selection target are reflected on the print setting screen 1000. If an "OK" button is pressed in the print setting screen 1000, the selection target is printed. At this time, the information displayed in the region 1005 is changed or updated in accordance with the number of sheets and the user is notified of the number of sheets necessary for printing.

If a "cancel" button 1105 is pressed in the setting screen 1100 for page designation printing, the screen returns to the print setting screen 1000 regardless of the contents of operations up to that point.

In the setting screen 1100, the user can select a plurality of page data at once. For example, if a "select all" button 1106 is pressed, check marks are added to all the currently displayed checkboxes 1102, and some of the check marks can be removed from this state. If a "cancel all selections" button 1107 is pressed, check marks can be removed from all the checkboxes 1102 with check marks, and an initial state in which nothing is selected can be obtained. According to this mode, without individually inputting a check mark to each checkbox 1102, the user can select a plurality of items or cancel the selections and set desired page data to the print target at once.

Also, if a "select selected page and subsequent pages" button 1108 is pressed, check marks are added to, in all the checkboxes 1102, the checkbox 1102 including the currently selected page data and subsequent checkboxes. For example, in FIG. 11A, if the "select selected page and subsequent pages" button 1108 is pressed in a state in which "text 6" is selected, check marks are added to the checkbox 1102 corresponding to "text 5" and "text 6" and subsequent checkboxes. Hence, if printing is not appropriately implemented for a certain one of a plurality of sheets and sheets after that because of, for example, paper jam or ink deficiency, the user can appropriately reattempt only printing of the/these sheets. Similarly, if a "select selected page and preceding pages" button 1109 is pressed, check marks are added to, in all the checkboxes 1102, the checkbox 1102 including the currently selected page data and preceding checkboxes. Hence, if printing is not appropriately implemented for some sheets after the start of printing, the user can appropriately reattempt only printing of the/these sheets.

Note that the order of arrangement of the displayed page data may be changed between a case in which right-side binding is selected in the basic setting and a case in which left-side binding is selected. For example, in the setting screen 1100, if right-side binding is selected, the page data are arranged sequentially from right to left (see FIG. 11A), and if left-side binding is selected, the page data are arranged sequentially from left to right (see FIG. 11B). This can provide a Graphical User Interface (GUI) that the user can intuitively understand.

Figure 12A:
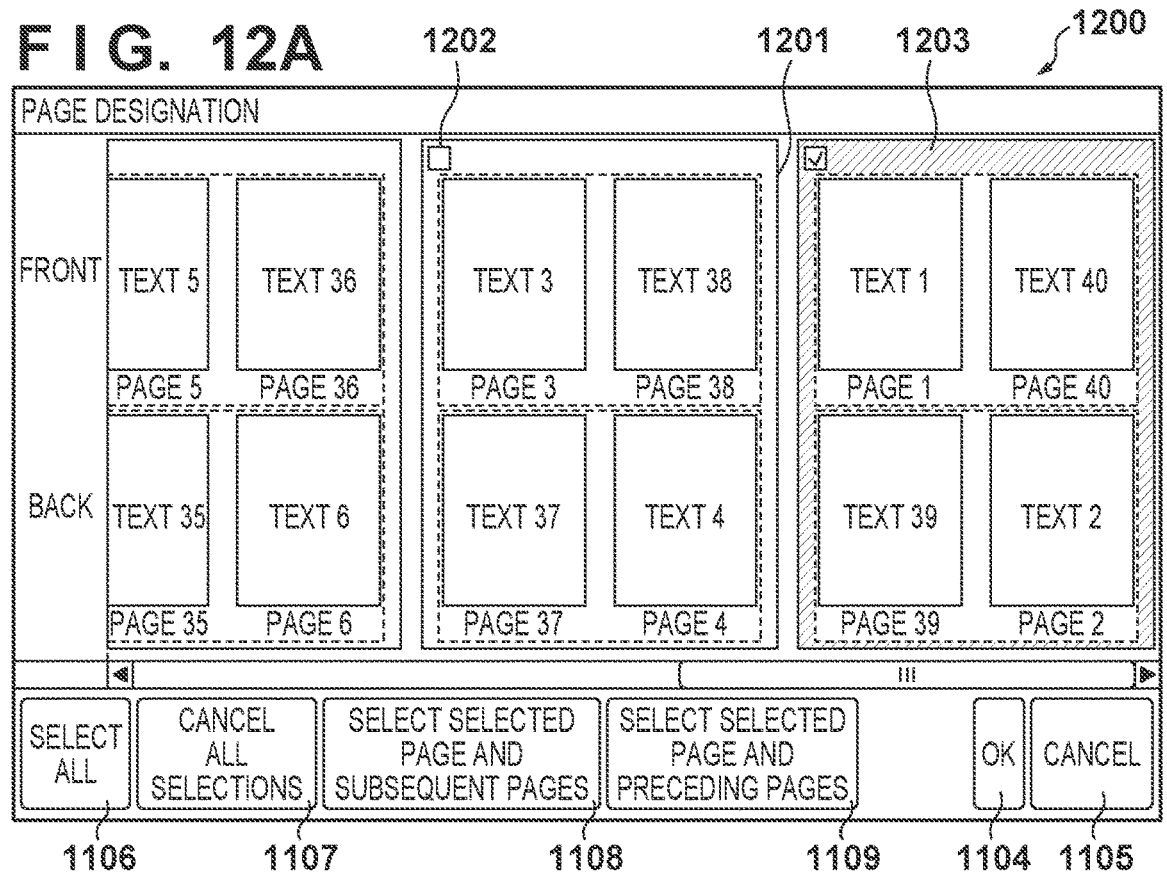
FIG. 12A is a schematic view showing an example of the setting screen for page designation printing.
Figure 12B:
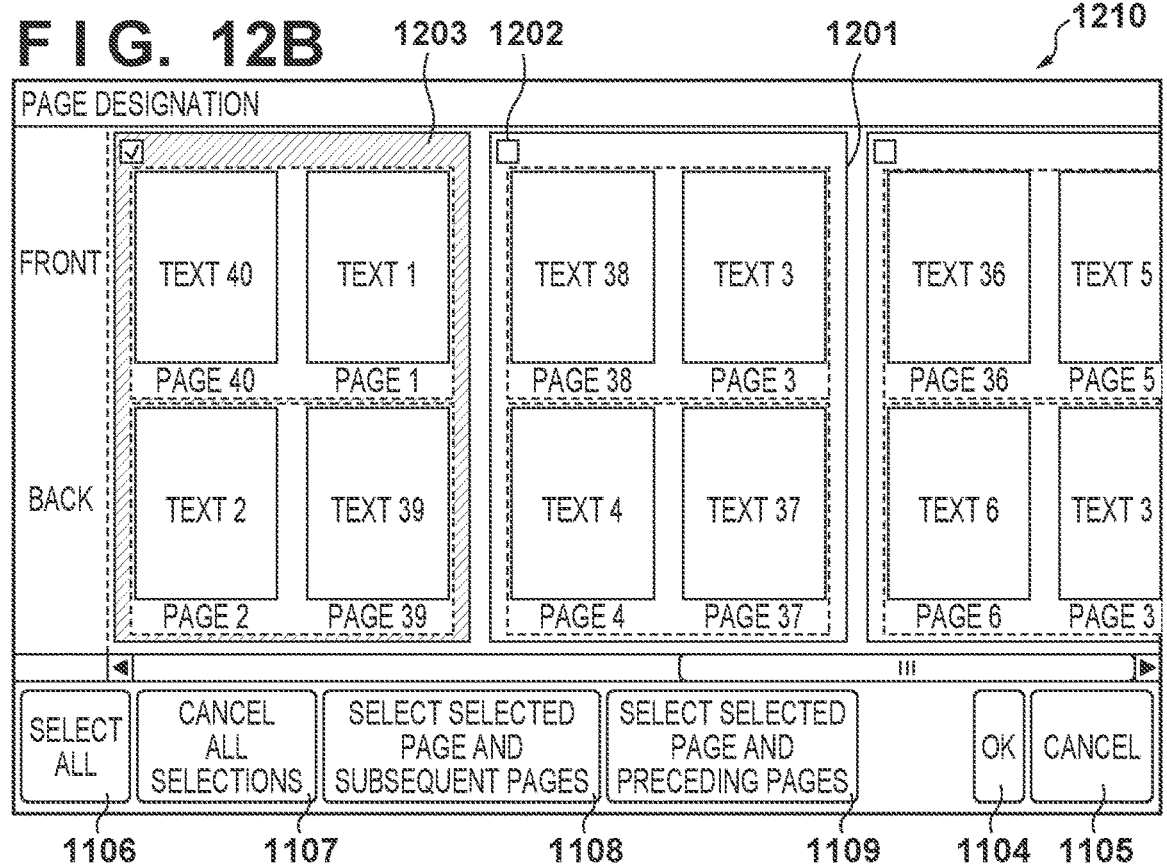
FIG. 12B is a schematic view showing an example of the setting screen for page designation printing.

FIG. 12A shows an example of a setting screen 1200 in a case in which saddle stitch (2-in-1) and right-side binding are selected. FIG. 12B shows an example of a setting screen 1210 in a case in which saddle stitch (2-in-1) and left-side binding are selected.

Note that if saddle stitch (2-in-1) and right-side binding are selected, letting N be the total number of pages and m be an integer of 0 or more, the (N/2+2m+2)th page is printed on the right side of the front surface of one sheet. Also, the (N/2−2m−1)th page is printed on the left side of the front surface of the sheet, the (N/2−2m)th page is printed on the right side of the back surface of the sheet, and the (N/2+2m+1)th page is printed on the left side of the back surface of the sheet.

In this example, N=40. The (40/2+2m+2)th page (the 40th page if m=9) is printed on the right side of the front surface of a certain sheet, and the (40/2−2m−1)th page (the first page if m=9) is printed on the left side of the front surface of the sheet. Also, the (40/2−2m)th page (the second page if m=9) is printed on the right side of the back surface of the sheet, and the (40/2+2m+1)th page (the 39th page if m=9) is printed on the left side of the back surface of the sheet.

Note that if saddle stitch (2-in-1) and left-side binding are selected, the (N/2−2m−1)th page is printed on the right side of the front surface of one sheet. Also, the (N/2+2m+1)th page is printed on the left side of the front surface of the sheet, the (N/2+2m+1)th page is printed on the right side of the back surface of the sheet, and the (N/2−2m)th page is printed on the left side of the back surface of the sheet.

As described above, if saddle stitch is selected, arithmetic processing for specifying page data to be printed on each sheet is necessary. According to this embodiment, all page data to be printed on each sheet are indicated by a frame 1201, like the setting screen 1200 (and the setting screen 1210). This allows the user to visually recognize the contents printed on each sheet and relatively easily select a sheet to be printed by inputting a check mark to a checkbox 1202. Also, like the region 1103 shown in FIGS. 11A and 11B, the page data selected using the checkbox 1202 are highlighted by solid fill, as indicated by a region 1203.

Figure 13A:
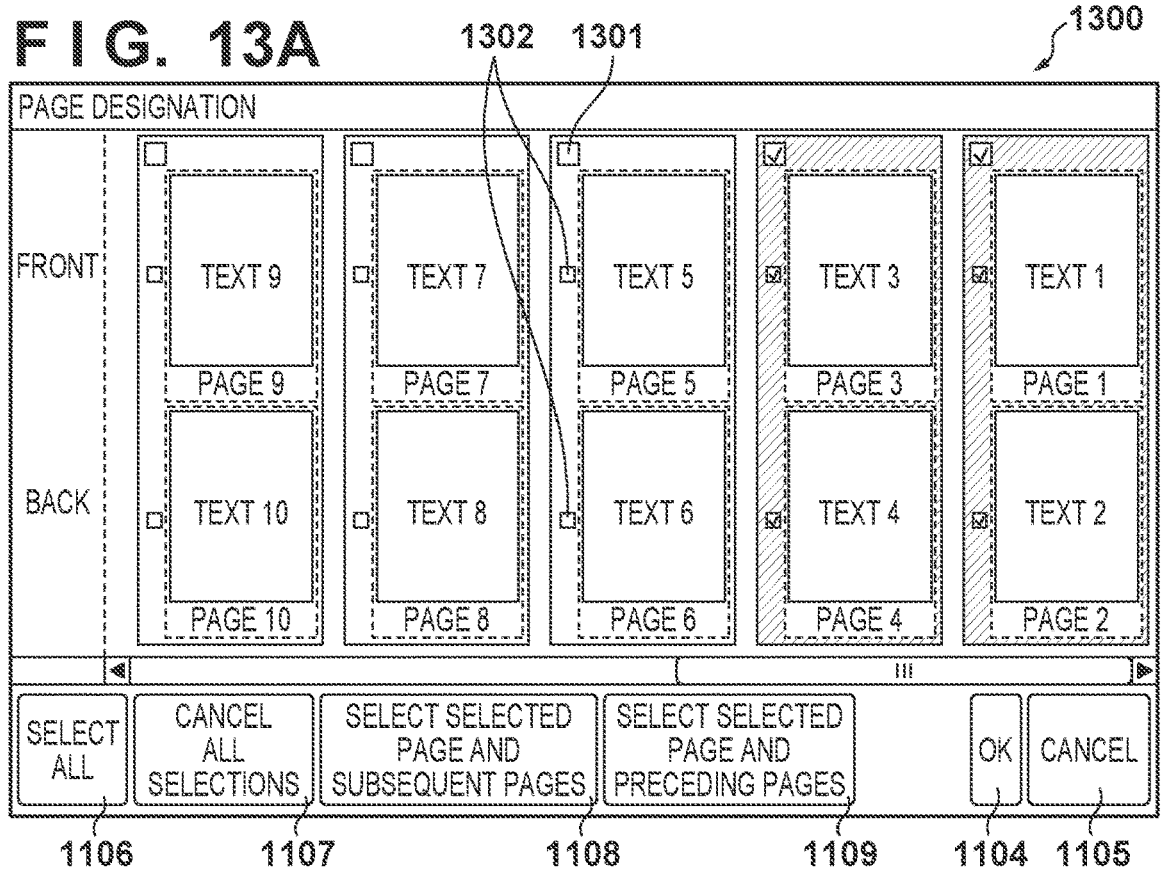
FIG. 13A is a schematic view showing an example of the setting screen for page designation printing.
Figure 13B:
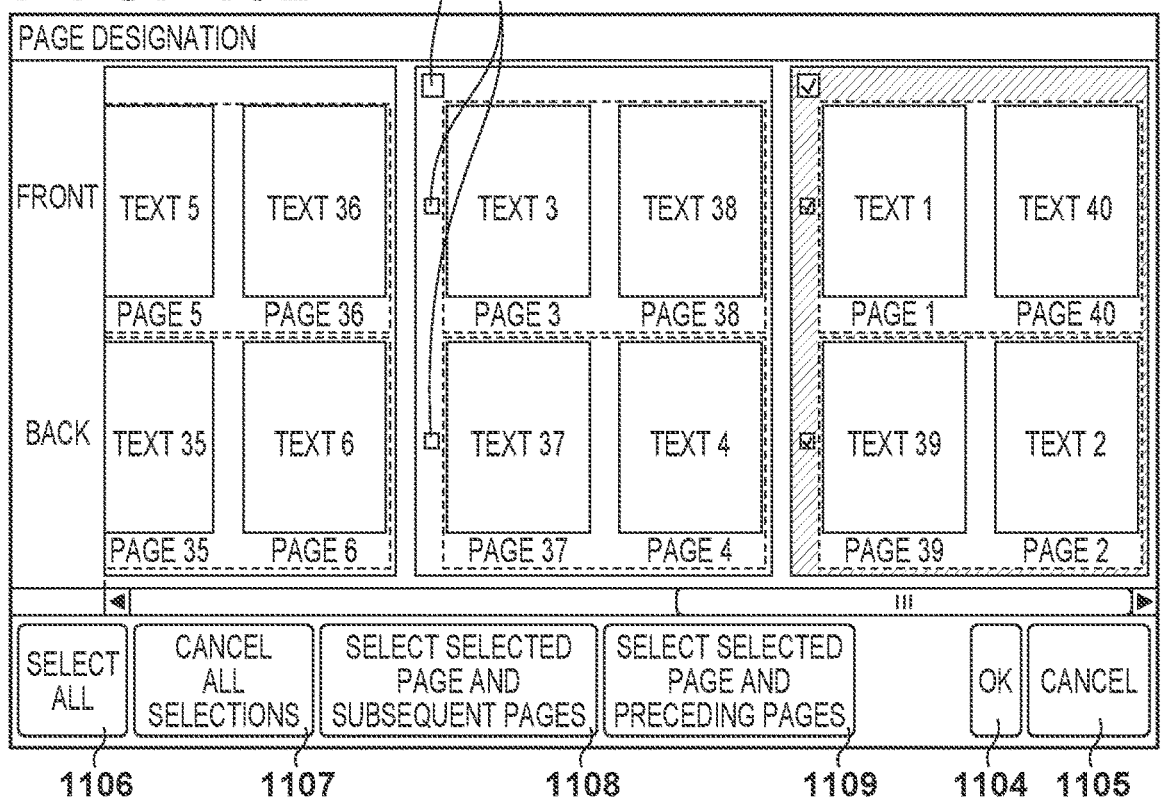
FIG. 13B is a schematic view showing an example of the setting screen for page designation printing.

FIG. 13A shows a setting screen 1300 as another example of the setting screen 1100 shown in FIG. 11A. FIG. 13B shows a setting screen 1310 as another example of the setting screen 1200 shown in FIG. 12A.

If multiple sheet conveyance (conveying sheets in an overlap state) occurs in the printing apparatus 151 at the time of printing, a sheet may be output after printing is performed only on one surface. In this case, since printing on one surface can appropriately be completed, only printing on the other surface need be reattempted using the sheet. As shown in FIGS. 13A and 13B, checkboxes 1302 and 1312 that allow the user to individually select front surfaces and back surfaces may be provided independently of checkboxes 1301 and 1311. If a check mark is added to one of the checkboxes 1302 and 1312, only corresponding page data is specified as a print target, and only printing of the/these sheets is performed.

In the example shown in FIG. 13A, the checkboxes 1302 and 1312 are displayed for all corresponding page data but may be displayed in a different mode. For example, the checkbox 1302 (or 1312) may be displayed when a check mark is added to the checkbox 1301 (or 1311). As another example, if check marks are added to a plurality of checkboxes 1301 (or 1311), the checkboxes 1302 and 1312 may not be displayed.

According to this embodiment, the original data is displayed in a mode in which page data is laid out in correspondence with each of a plurality of sheets that form a book. This makes it possible to relatively easily specify print target page data or its sheet number, that is, perform some printing processes in a desired mode, and therefore improve the convenience of printing for a book.

In one of FIGS. 11A to 12B, if the "OK" button 1104 is pressed in a state in which a print target sheet is selected, the bookbinding application 201 displays the print setting screen 1000 shown in FIG. 10. If the "OK" button 1009 is pressed here, the bookbinding application 201 generates application data based on the page data that should be laid out on the sheet selected in one of FIGS. 11A to 12B. Similarly, if a check mark is added to the checkbox 1302 (or 1312) in FIGS. 13A and 13B, the bookbinding application 201 generates application data based on the page data that should be laid out on the selected sheet. The printer driver 202 receives the generated application data and executes printing.

Figure 14:
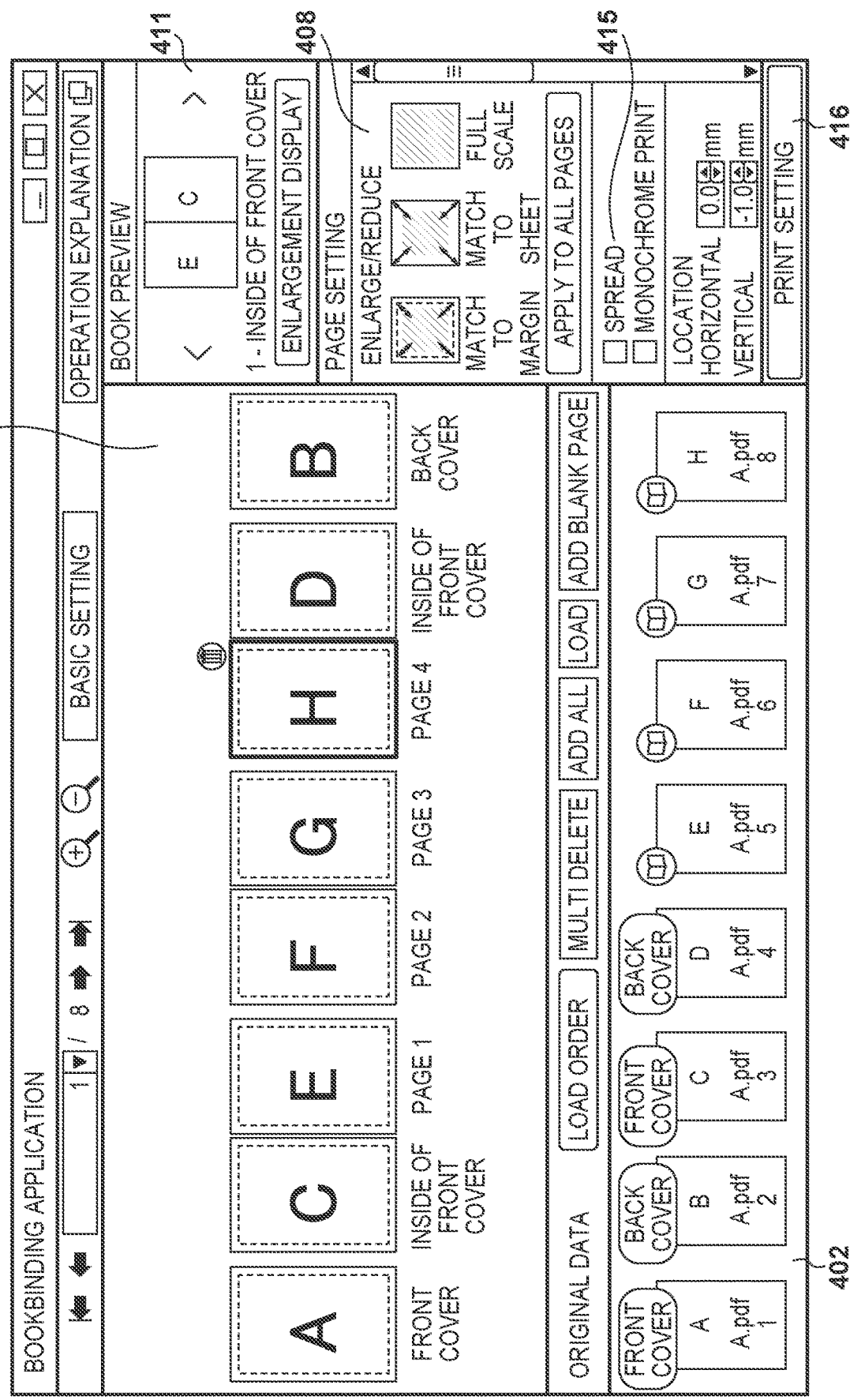
FIG. 14 is a schematic view showing an example of the edit screen in the bookbinding application.

FIG. 14 shows an example of an edit screen 1400 in a case in which contents for selecting left-side binding and using the same type of sheets for the covers and text are set in the edit screen 400 shown in FIG. 4, and page data are arranged in the original data region 402 by a method shown in FIGS. 16 to 19 to be described later. In this example, since the pages of the book formed by bookbinding printed products sequentially advance from left to right, the page data are displayed sequentially from left to right in the edit region 401. Note that A, B, C, and D are displayed as covers, and E, F, G, and H are arranged and displayed as text from page 1. In the original data region 402, E, F, G, and H are displayed from left to right after the page data of the covers.

Figure 15:
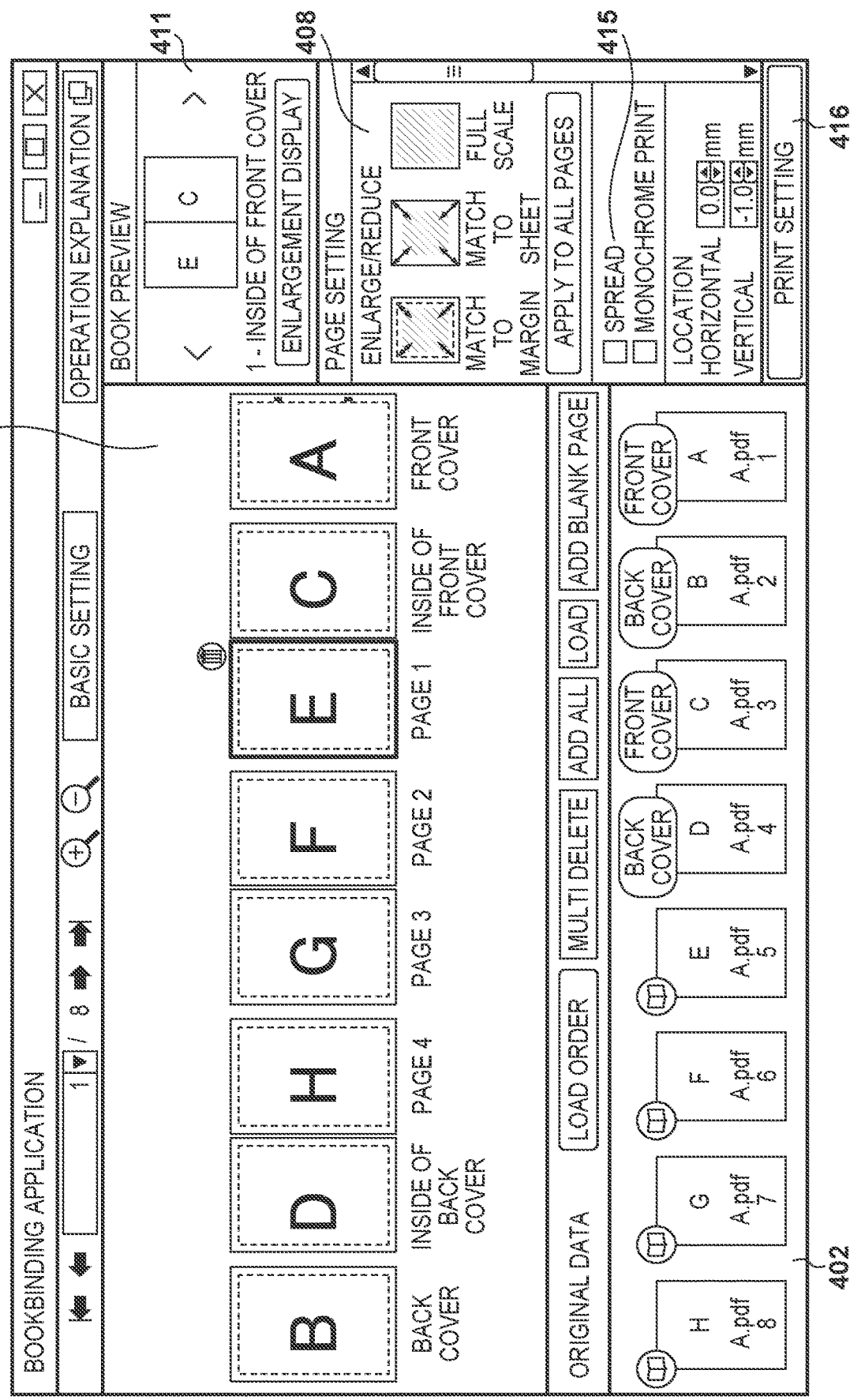
FIG. 15 is a schematic view showing an example of the edit screen in the bookbinding application.

FIG. 15 shows an example of an edit screen 1500 in a case in which contents for selecting right-side binding and using the same type of sheets for the covers and text are set in the edit screen 400 shown in FIG. 4, and page data are arranged in the original data region 402 by the method shown in FIGS. 16 to 19 to be described later. In this example, since the pages of the book formed by bookbinding printed products sequentially advance from right to left, the page data are displayed sequentially from right to left (in a direction reverse to that in FIG. 14) in the edit region 401.

Figure 16:
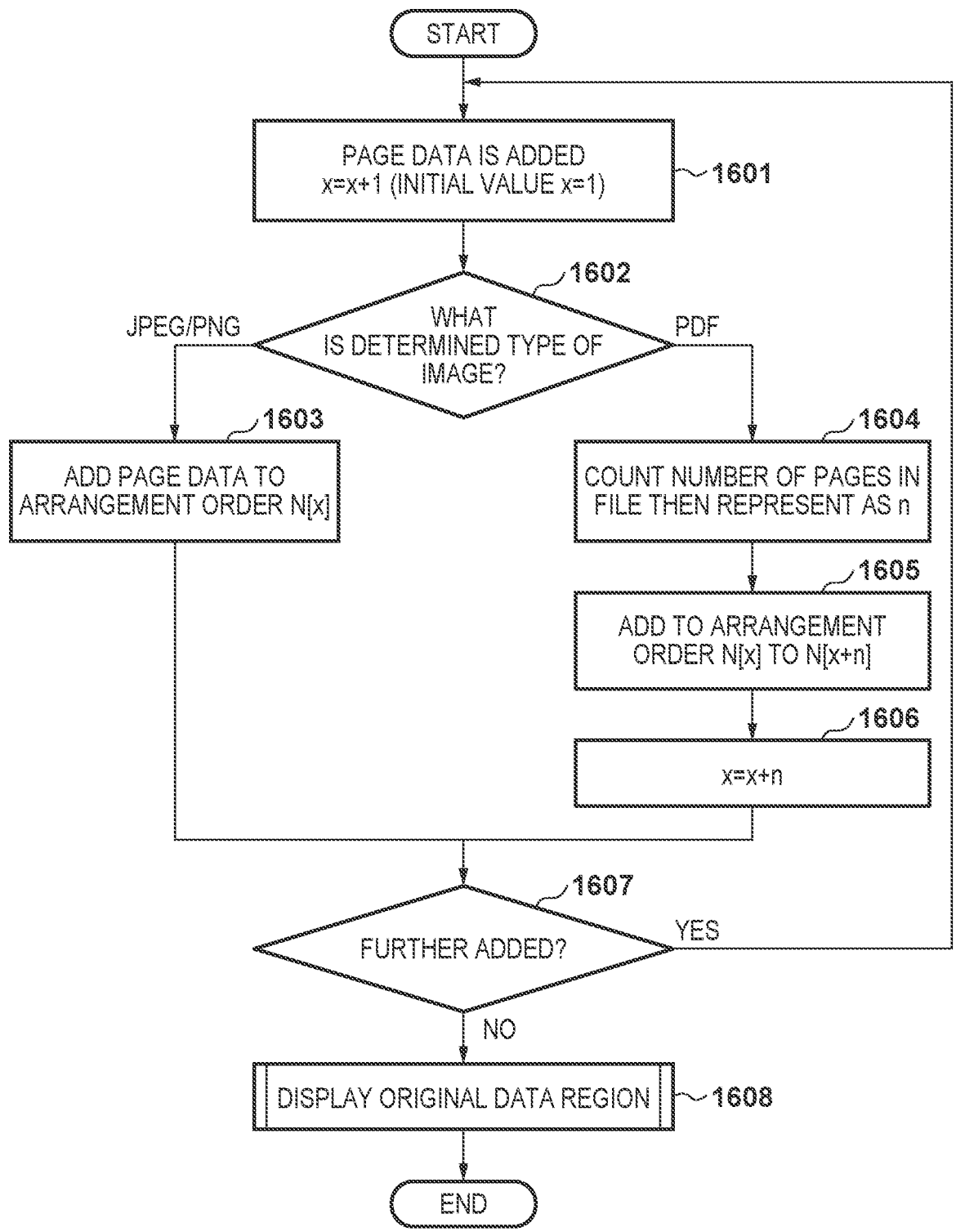
FIG. 16 is a flowchart showing an example of arithmetic processing when adding page data in the bookbinding application.

FIG. 16 is a flowchart showing the contents of arithmetic processing when adding page data to the original data region 402 in the bookbinding application 201.

In step 1601, it is determined whether page data is added to the original data region 402. Here, using a parameter x (initial value x=1), if page data is added, x=x+1 is set (1 is added to x), and the process advances to step 1602.

In step 1602, the type of the image of the added page data is determined. In this example, in a case of JPEG or PNG, the process advances to step 1603. In a case of PDF, the process advances to step 1604. Additionally, the type of another image may further be taken into consideration. This determination is performed based on, for example, whether a plurality of pages are included in one file. If a plurality of files are included in the addition target image format, the process advances to step 1604; otherwise, the process advances to step 1603.

In step 1603, page data is added to an arrangement order N[x], and the process advances to step 1607.

In step 1604, the number of pages in the addition target file is counted, and the counted number of pages is represented by n.

In step 1605, page data are added from the arrangement order N[x] to N[x+n]. Furthermore, in step 1606, x=x+n is set (n is added to x), and the process advances to step 1607.

In step 1607, it is determined whether page data is further added. If page data is further added, the process returns to step 1601; otherwise, the process advances to step 1608.

In step 1608, the original data region 402 is displayed. Details will be described with reference to FIG. 17.

Figure 17:
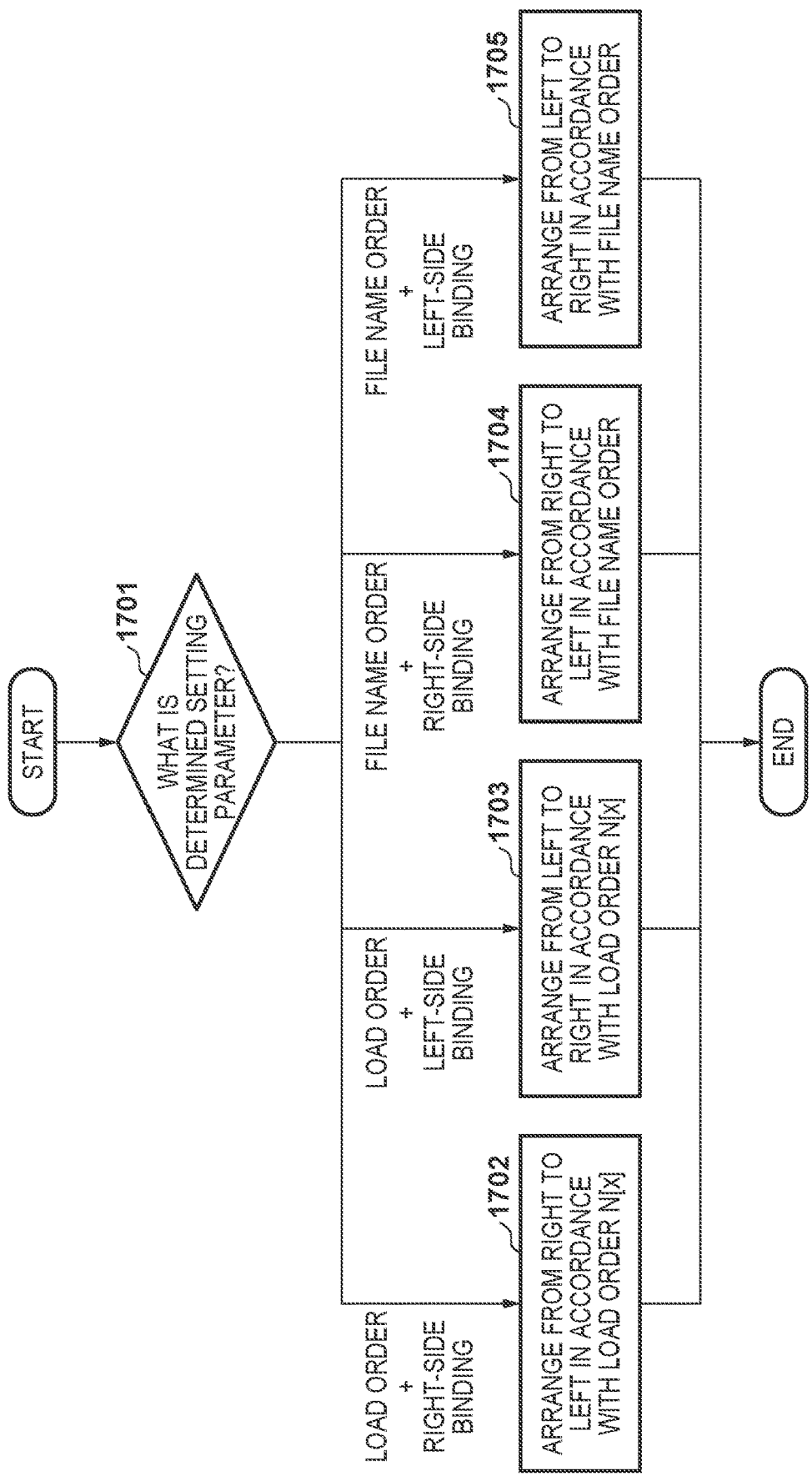
FIG. 17 is a flowchart showing an example of a page data arranging method that is changed based on a setting.

FIG. 17 is a flowchart showing an example of a method of arranging page data displayed in the original data region 402.

In step 1701, the setting parameter is determined based on the order of page data set by the pull-down menu 405 and the binding method set in the binding direction setting region 305. In this example, if "load order" and "right-side binding" are set, the process advances to step 1702 to arrange the page data from right to left in the arrangement order n[x] in FIG. 16. If "load order" and "left-side binding" are set, the process advances to step 1703 to arrange the page data from left to right in the arrangement order n[x] in FIG. 16. If "file name order" and "right-side binding" are set, the process advances to step 1704 to arrange the page data from right to left in the file name order. If "file name order" and "left-side binding" are set, the process advances to step 1705 to arrange the page data from left to right in the file name order.

In this way, the page data are displayed in a layout mode desired by the user based on the page data order set by the pull-down menu 405 and the binding method set in the binding direction setting region 305. Note that if the page data that should be displayed cannot fit in the original data region 402, some corresponding page data of these can be displayed using a slide bar or the like.

Note that FIG. 17 is a flowchart in a case in which the original data region 402 is provided in the horizontal direction. However, the original data region 402 may be provided in the vertical direction. In this case, the page data are arranged in the vertical direction and displayed.

Figure 18:
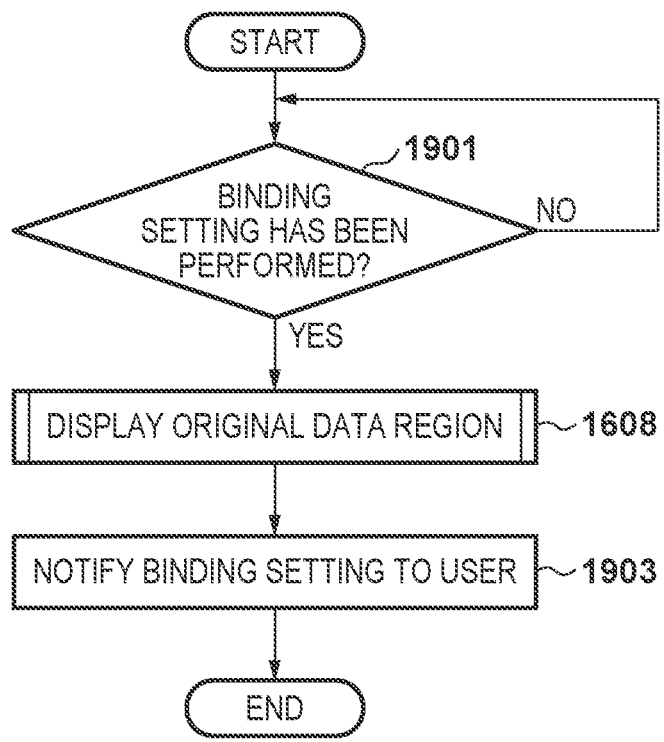
FIG. 18 is a flowchart in a case in which display of an edit screen is changed or updated.

FIG. 18 is a flowchart in a case in which display of the edit screen is changed or updated in response to setting of the binding method. That is, if the binding method is set in the binding direction setting region 305 shown in FIG. 3, page data displayed in the original data region 402 are rearranged.

In step 1901, it is determined whether the binding method is set. If the binding method is set, the process advances to step 1608; otherwise, the process returns to step 1901. In step 1608, display of the original data region 402 is changed or updated based on the flowchart described with reference to FIG. 17. After that, in step 1903, the user is notified of the binding setting. For example, a message representing the state after the setting change is displayed.

According to this embodiment, the information processing apparatus 101 causes the bookbinding application 201 to rearrange the order of original data of a plurality of pages and perform book allocation, thereby generating book data. The book data includes page data of covers, which are the page data of a front cover and a back cover and, additionally, the inside surfaces of the/these covers, and the page data of a text. The user can arbitrarily select original data to be added to the book data from the original data of the plurality of pages. By accepting the operation input of the selection by the user, necessary page data of the original data can collectively be incorporated in the book data. The original data and the book data are displayed along one direction on the display unit 108 as the edit screen 400 shown in FIG. 4, or the like. Book allocation is performed based on the setting of the binding method in bookbinding, and the arrangement order of the page data of the book data to be displayed is changed or adjusted based on the setting.

Printing for a book may be performed for the whole book data generated in the above-described way but may be performed for a part of the book data. When performing printing for a part of the book data, the user can visually recognize the page data for each corresponding sheet, and can perform editing such as change, insertion, and deletion collectively for the/these book data as needed and also manage the book data. According to this mode, it is possible to relatively easily implement printing for a book in which the print settings are readily cumbersome and thus improve the convenience.

Note that the concept of the information processing apparatus 101 includes a device in which the bookbinding application 201 (or a program capable of substantially implementing the function) is installed, and the information processing apparatus 101 may be expressed as an image processing apparatus or an image layout apparatus.

In the above explanation, to facilitate understanding, each element is denoted using a name associated with its function. However, the elements are not limited to those having the contents described in the embodiment as their main function, and may auxiliarily have the functions. Hence, the expression of each element is not strictly limited and can be replaced with a similar expression. To the same effect, the expression "apparatus" may be replaced with "unit", "component to piece", "member", "structure", "assembly", or the like, or may be omitted.

(Program)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-014435, filed Feb. 1, 2022 which is hereby incorporated by reference herein in its entirety.

What is claimed is:

1. An information processing apparatus comprising:
(a) circuitry, (b) at least one processor and a memory, the memory comprising instructions that are executed by the at least one processor, or (c) circuitry, at least one processor, and a memory, the memory comprising instructions that are executed by the at least one processor, the (a) circuitry, (b) at least one processor and a memory, the memory comprising instructions that are executed by the at least one processor, or (c) circuitry, at least one processor, and a memory, the memory comprising instructions that are executed by the at least one processor, being configured to function as a plurality of units comprising:
(1) a first displaying unit configured to display, in a first displaying region, a preview corresponding to at least one of a plurality of pages, wherein the plurality of pages are included in a printed product having a book form which is to be printed based on book data;
(2) a second displaying unit configured to display a plurality of allocation object data in a second displaying region which is different from the first displaying region, wherein, in a case where any one is selected from the plurality of allocation object data, the selected allocation object data is allocated to any one of the plurality of pages and is displayed in the first displaying region as a preview of a page to which the selected allocation object data is allocated; and
(3) a setting unit configured to set a binding method of the printed product having the book form,
wherein the second displaying unit changes an arrangement order of the plurality of allocation object data displayed in the second displaying region, based on whether the set binding method is a first binding method or a second binding method being different from each other.

2. The apparatus according to claim 1, wherein the first displaying unit changes an arrangement order of a plurality of previews, corresponding to the plurality of pages, displayed in the first displaying region, based on whether the set binding method is the first binding method or the second binding method.

3. The apparatus according to claim 1, wherein the book data includes page data of a front cover and a back cover and page data of a text.

4. The apparatus according to claim 1, wherein the first binding method is any one a plurality of binding methods including side stitch, saddle stitch, left-side binding, and right-side binding, and
wherein the second binding method is another of the plurality of binding methods.

5. A non-transitory computer-readable storage medium storing a program, the program being configured to cause a computer to function as each unit of the information processing apparatus according to claim 1.

6. The apparatus according to claim 1, wherein in a case where the set binding method is set to right-side binding as the first binding method, the plurality of allocation object data are displayed in the second displaying region in order from a right side to a left side, and
wherein in a case where the set binding method is set to left-side binding as the second binding method, the plurality of allocation object data are displayed in the second displaying region in order from the left side to the right side.

7. The apparatus according to claim 1, wherein the arrangement order of the plurality of allocation object data is controlled based on a filename order.

8. The apparatus according to claim 1, wherein the first displaying region and the second displaying region are displayed by a predetermined application program,
wherein the plurality of allocation object data are read out by the predetermined application program in accordance with being selected in a file selection dialog, and
wherein the arrangement order of the plurality of allocation object data is controlled based on an order of the reading out.

9. The apparatus according to claim 1, wherein a mark indicating a binding position is displayed in the preview displayed in the first displaying region.

10. The apparatus according to claim 1, wherein the plurality of units further comprises an execution unit configured to cause a printing apparatus to execute a printing operation based on the book data.

11. The apparatus according to claim 1, wherein in a case where PDF data is included in the second displaying region and the PDF data includes the plurality of allocation object data corresponding to the plurality of pages, then the second displaying unit changes an arrangement order of the plurality of allocation object data which are displayed in the second displaying region and included in the PDF data, based on whether the set binding method is the first binding method or the second binding method.

12. An information processing method for executing printing, the method comprising:
displaying, in a first displaying region, a preview corresponding to at least one of a plurality of pages, wherein the plurality of pages are included in a printed product having a book form which is to be printed based on book data;
displaying a plurality of allocation object data in a second displaying region which is different from the first displaying region, wherein, in a case where any one is selected from the plurality of allocation object data, the selected allocation object data is allocated to any one of the plurality of pages and is displayed in the first displaying region as a preview of a page to which the selected allocation object data is allocated; and
setting a binding method of the printed product having the book form,
wherein in the displaying the plurality of allocation object data in the second displaying region, an arrangement order of the plurality of allocation object data displayed in the second displaying region is changed based on whether the set binding method is a first binding method or a second binding method being different from each other.

13. The method according to claim 12, wherein in the displaying the preview in the first displaying region, an arrangement order of a plurality of previews, corresponding to the plurality of pages, displayed in the first displaying region is changed, based on whether the set binding method is the first binding method or the second binding method.

14. The method according to claim 12, wherein the book data includes page data of a front cover and a back cover and page data of a text.

15. The method according to claim 12, wherein the first binding method is any one a plurality of binding methods including side stitch, saddle stitch, left-side binding and right-side binding, and
wherein the second binding method is another of the plurality of binding methods.

16. The method according to claim 12, wherein in a case where the set binding method is set to right-side binding as the first binding method, the plurality of allocation object data are displayed in the second displaying region in order from a right side to a left side, and
wherein in a case where the set binding method is set to left-side binding as the second binding method, the plurality of allocation object data are displayed in the second displaying region in order from the left side to the right side.

17. The method according to claim 12, wherein the arrangement order of the plurality of allocation object data is controlled based on a filename order.

18. The method according to claim 12, wherein the first displaying region and the second displaying region are displayed by a predetermined application program,
wherein the plurality of allocation object data are read out by the predetermined application program in accordance with being selected in a file selection dialog, and
wherein the arrangement order of the plurality of allocation object data is controlled based on an order of the reading out.

19. The method according to claim 12, wherein a mark indicating a binding position is displayed in the preview displayed in the first displaying region.

20. The method according to claim 12, further comprising causing a printing apparatus to execute a printing operation based on the book data.

21. The method according to claim 12, wherein in the displaying the plurality of allocation object data in the second displaying region, in a case where PDF data is included in the second displaying region and the PDF data includes the plurality of allocation object data corresponding to the plurality of pages, an arrangement order of the plurality of allocation object data, which are displayed in the second displaying region and included in the PDF data, is changed based on whether the set binding method is the first binding method or the second binding method.

* * * * *